(12) United States Patent
Whitehead

(10) Patent No.: US 8,069,171 B2
(45) Date of Patent: *Nov. 29, 2011

(54) METHOD AND SYSTEM FOR CORRELATING INFORMATION

(75) Inventor: Jeffrey A. Whitehead, Oakland, CA (US)

(73) Assignee: Reqall, Inc., Moffett Field, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 12/233,701

(22) Filed: Sep. 19, 2008

(65) Prior Publication Data

US 2009/0012947 A1   Jan. 8, 2009

Related U.S. Application Data

(63) Continuation of application No. 11/369,046, filed on Mar. 6, 2006, now Pat. No. 7,437,373.

(51) Int. Cl.
G06F 17/30 (2006.01)
(52) U.S. Cl. .................................. 707/736; 707/956
(58) Field of Classification Search .................. 707/736, 707/800
See application file for complete search history.

(56) References Cited

U.S. PATENT DOCUMENTS

| | | | |
|---|---|---|---|
| 4,616,333 A | 10/1986 | Shimoni | |
| 5,897,612 A | 4/1999 | Schwengler et al. | |
| 5,970,496 A | 10/1999 | Katzenberg | |
| 6,332,163 B1 | 12/2001 | Bowman-Amuah | |
| 6,373,994 B1 | 4/2002 | Anderson | |
| 6,611,930 B1 | 8/2003 | Ostrowsky et al. | |
| 6,799,114 B2 | 9/2004 | Etnyre | |
| 6,820,086 B1 * | 11/2004 | Iacobovici et al. | 1/1 |
| 7,007,030 B2 | 2/2006 | Zibin et al. | |
| 7,065,529 B1 | 6/2006 | Watanabe | |
| 7,308,643 B1 | 12/2007 | Zhu et al. | |
| 2004/0205080 A1 | 10/2004 | Patel | |
| 2005/0050099 A1 | 3/2005 | Bleistein et al. | |

OTHER PUBLICATIONS

Tan et al.; Role Classification of Hosts within Enterprise Networks Based on Connection Patterns; 4 pages.
Clarke et al.; Method for Correlating Graphical Data On An Interactive Display; 2 pages.
Notice of Allowance (Mail Date Jul. 29, 2008) for U.S. Appl. No. 11/369,046, filed Mar. 6, 2006; Confirmation No. 7339.

* cited by examiner

*Primary Examiner* — James Trujillo
*Assistant Examiner* — Jorge A Casanova
(74) *Attorney, Agent, or Firm* — Schmeiser, Olsen & Watts, LLP

(57) ABSTRACT

A method and system for correlating input data that includes configuration data. The configuration data describes at least one hierarchy including a first hierarchy. Each hierarchy includes at least two nodes. Each node includes a value and is designated as an ontology end point consisting of a unique positive integer. For each hierarchy, a unique relationship number RN is stored in a medium for each pair of parent-child nodes of each hierarchy. RN is a function of X and Y which respectively denote the ontology end point of the parent and child node of each pair of parent-child nodes. Responsive to a query that identifies a measure of correlation between the first hierarchy and other information, the measure of correlation is computed by retrieving and utilizing each stored relationship number of the first hierarchy. Information relating to the measure of correlation is outputted.

25 Claims, 34 Drawing Sheets

Conditional Operators

\>    is greater than

<    is less than

=    is equal to

>=    is greater than or equal to

<=    is less than or equal to

!=    is not equal to

:    is in set

!:    is not in set

*FIG. 5*

Configuration Data

101

Music

Berkeley campus $location = Oakland

*FIG. 4*

| Y | 2 | 3 | 3 | 4 | 4 | 4 | 4 | 5 | 5 | 5 | 5 | ...to a limit of n |
| X | 1 | 1 | 2 | 1 | 2 | 3 | 1 | 2 | 3 | 4 | | ...to a limit of n − 1 |
| RN | 1 | 2 | 3 | 4 | 5 | 6 | 7 | 8 | 9 | 10 | | ...((Y − 1)² − (Y − 1))/2 + X |

RAM
—— Endpoint Ontology Mappings ——

| Index | Value |
|-------|-------|
| 000004 | -000001 |
| 000005 | 000006 |
| 000006 | +000002 |
| 000007 | 000008 |
| 000008 | +000004 |
| 000009 | 000000 |

```
unsigned long long int get_integer_squareroot(unsigned long long int ARG)
{
    unsigned long long int RESULT = 0;
    unsigned long long int TEMP = 0;
    unsigned long long int MASK = 0;

for( MASK = 0x1000000000000000; MASK != 0; MASK >>= 2 )
    {
        TEMP = RESULT + MASK;
        RESULT >>= 1;
        if( TEMP <= ARG )
        {
            ARG -= TEMP;
            RESULT += MASK;
        }
    }
    return RESULT;
}
```

*FIG. 16*

FIG. 19 config>oep>create>Music

FIG. 20 config>oep>create>$a > $b

FIG. 21 config>oep>create>101>Music>Berkeley campus>$location = Oakland

FIG. 22 config>oep>delete>101

FIG. 23 config>nep>create>Jeff

FIG. 24 config>eom>create>Jeff>Music>101>101>Berkeley campus>101>$location = Oakland

| RAM | | | Disk | | |
|---|---|---|---|---|---|
| Node Pointer List | | | Ontology End Point Master List | | |
| Index | Value | | Index | Value | |
| 000001 | 010001 | | 000001 | 101 | |
| 000002 | 000004 | | 000002 | Music | |
| 000003 | 000010 | | 000003 | Berkeley campus | |
| 000010 | 010002 | | 000004 | $location = Oakland | |
| 000011 | 000013 | | 000005 | Live | |
| 000012 | 000000 | | 000006 | Concert | |
| | | | 000007 | Berkeley | |
| Endpoint Ontology Mappings | | | 000008 | Oakland | |
| Index | Value | | 000009 | Instrumental | |
| 000004 | -000001 | | 000010 | Cello | |
| 000005 | 000006 | | 000011 | Guitar | |
| 000006 | +000002 | | | | |
| 000007 | 000008 | | Node End Points | | |
| 000008 | +000004 | | Index | Value | |
| 000009 | 000000 | | 010001 | Jeff | |
| 000013 | -000015 | | 010002 | Maria | |
| 000014 | 000015 | | | | |
| 000015 | +000041 | | | | |
| 000016 | 000017 | | | | |
| 000017 | -000043 | | | | |
| 000018 | 000019 | | | | |
| 000019 | -000044 | | | | |
| 000020 | 000000 | | | | |

*FIG. 26*

RAM

———— Node Pointer List ————

| Index | Value |
|---|---|
| 000001 | 010001 |
| 000002 | 000004 |
| 000003 | 000010 |
| 000010 | 010002 |
| 000011 | 000013 |
| 000012 | 000000 |

———— Endpoint Ontology Mappings ————

| Index | Value |
|---|---|
| 000004 | -000001 |
| 000005 | 000006 |
| 000006 | +000002 |
| 000007 | 000008 |
| 000008 | +000004 |
| 000009 | 000021 |
| 000013 | -000015 |
| 000014 | 000015 |
| 000015 | +000041 |
| 000016 | 000017 |
| 000017 | -000043 |
| 000018 | 000019 |
| 000019 | -000044 |
| 000020 | 000000 |
| 000021 | +000015 |
| 000022 | 000023 |
| 000023 | +000021 |
| 000024 | 000025 |
| 000025 | +000035 |
| 000026 | 000027 |
| 000027 | +000045 |
| 000028 | 000029 |
| 000029 | +000054 |
| 000030 | 000000 |

Disk

———— Ontology End Point Master List ————

| Index | Value |
|---|---|
| 000001 | 101 |
| 000002 | Music |
| 000003 | Berkeley campus |
| 000004 | $location = Oakland |
| 000005 | Live |
| 000006 | Concert |
| 000007 | Berkeley |
| 000008 | Oakland |
| 000009 | Instrumental |
| 000010 | Cello |
| 000011 | Guitar |

———— Node End Points ————

| Index | Value |
|---|---|
| 010001 | Jeff |
| 010002 | Maria |

*FIG. 27*

```xml
<?xml version="1.0" encoding="UTF-8"?>
<rss xmlns:dc="http://purl.org/dc/elements/1.1/" xmlns:rdf="http://www.w3.org/1999/02/22-rdf-syntax-ns#" xmlns:taxo="http://purl.org/rss/1.0/modules/taxonomy/" version="2.0">
  <channel>
    <title>The Real Time Matrix Media Channel</title>
    <link>http://www.realtimematrix.com</link>
    <description>Music to demonstrate preference matching.</description>
    <language>en-us</language>
    <copyright>Copyright 2006, The Real Time Matrix Corporation</copyright>
    <pubDate>Wed, 11 Jan 2006 20:11:44 GMT</pubDate>
    <lastBuildDate>Wed, 11 Jan 2006 20:11:44 GMT</lastBuildDate>
    <webMaster>webmaster@realtimematrix.com</webMaster>
    <image>
      <title>Real Time Matrix</title>
      <url>http://www.realtimematrix.com/images/rtmlogo.gif</url>
      <link>http://www.realtimematrix.com</link>
    </image>
    <item>
      <title>Live Music Podcast</title>
      <link>http://www.realtimematrix.com</link>
      <description>Music item. Recorded live at Berkeley</description>
      <enclosure length="40022" type="audio/mpeg"
        url="http://www.realtimematrix.com/rss/media/LiveMusic.mp3"/>
      <category domain="http://www.realtimematrix.net/demo">FM, MP3, Free, live, music, Berkeley campus</category>
      <author>podcast@realtimematrix.com</author>
    </item>
  </channel>
</rss>
```

FIG. 32 pub>item-id>arg1>arg2>arg3>... ...>argN

*FIG. 33*

Comparison Data Set Argument Examples

101

Music

Berkeley campus $location = Oakland $time = 12:00:00

$rate = .25

!sms-notify = TRUE

*FIG. 34* pub>Wed, 11 Jan 2006 20:11:44 GMT Live Music Podcast>
!coverage=$percent>$percent=.6>
Music>item>Recorded>live>at>Berkeley>Music item>Recorded live>
FM>MP3>Free>Berkeley campus>$location=Berkeley>$location=Oakland

*FIG. 35*

Correlation Result Set — 382 item-id = (Wed, 11 Jan 2006 20:11:44 GMT Live Music Podcast)

match-list={(2, Music), (3, Berkeley campus), (4, $location=Oakland)} preference={(2,1) (1,3) (1,4)} match-list={(5, Live), (7, Berkeley)} preference={(5,6) (6,7) (7,9) (9,10) (9,11)}

Correlation Result Set — 383 item-id = (Wed, 11 Jan 2006 20:11:44 GMT Live Music Podcast)

nep=Jeff match-list={(2, Music), (3, Berkeley campus), (4, $location=Oakland)} preference={(2,1) (1,3) (1,4)} match-list={(5, Live), (7, Berkeley)} preference={(5,6) (6,7) (7,9) (9,10) (9,11)} nep=Maria match-list={(5, Live), (7, Berkeley)} preference={(6,5) (5,10) (10,7) (10,8)}

*FIG. 38*

Alternative Processing Set

!coverage=$percent $percent=.6

$location=Berkeley $location=$where-am-I
$where-am-I=Oakland
(4, $location=Oakland)

*FIG. 40* pub-result>Wed, 11 Jan 2006 20:11:44 GMTLive Music Podcast>Jeff (Music, .67)

*FIG. 41* pub-result>Wed, 11 Jan 2006 20:11:00 GMT>Wed, 11 Jan 2006 20:16:00 GMT>Dollar Alert>!sms=510-388-8014

METHOD AND SYSTEM FOR CORRELATING INFORMATION

This application is a continuation application claiming priority to Ser. No. 11/369,046, filed Mar. 6, 2006.

BACKGROUND OF THE INVENTION

1. Technical Field

The present invention relates to a method and system for correlating information.

2. Related Art

Text and multi-media information may be published in a manner that males it accessible over a data communication path or network (e.g., telephone lines, cable, wireless network, etc.). Such published information may be produced in such volume and frequency that it makes discovering relevant information difficult to one who desires to consume it. With the current state of the art, information is captured, indexed, and made available to consumers through a search metaphor. This approach involves indexing the information and applying search criteria against the indexed (or hashed) information. However, with this approach, the published information must be stored and indexed, incurring a high cost in digital storage as well as query processing when dealing with large amounts of information. It also introduces latency, as the information must be indexed and stored prior to being available for search. In an environment where the publication is continuous, such a system becomes costly, as the means to store and index the information must grow with the addition of newly-published information.

Thus, there is a need for a method and system for correlating information with high efficiency and low computing cost.

SUMMARY OF THE INVENTION

The present invention provides a method for correlating input data comprising correlation data, wherein the correlation data describes at least one hierarchy comprising a first hierarchy, wherein each hierarchy of the at least one hierarchy comprises at least two nodes, wherein the nodes of each hierarchy of the at least one hierarchy each comprise a value and are each designated as an ontology end point consisting of a unique positive integer, said method being implemented by execution of computer readable program code on a processor of a computer system, said method comprising:

for each hierarchy of the at least one hierarchy, computing and storing in a first computer-readable storage medium of the computer system: a unique relationship number RN as a function of X and Y for each pair of parent-child nodes of said each hierarchy of the at least one hierarchy, wherein X and Y respectively denote the ontology end point of the parent node and the child node of said each pair of parent-child nodes; and computing at least one measure of correlation between the first hierarchy and other information in response to a configuration correlation query that identifies the at least one measure of correlation to be computed, wherein said computing the at least one measure of correlation comprises retrieving and utilizing each stored relationship number of the first hierarchy; and outputting information relating to the computed at least one measure of correlation.

The present invention provides a computer program product, comprising a computer usable medium having a computer readable program code embodied therein, said computer readable program code when executed on a processor of a computer system implements a method for correlating input data comprising correlation data, wherein the correlation data describes at least one hierarchy comprising a first hierarchy, wherein each hierarchy of the at least one hierarchy comprises at least two nodes, wherein the nodes of each hierarchy of the at least one hierarchy each comprise a value and are each designated as an ontology end point consisting of a unique positive integer, said method comprising:

for each hierarchy of the at least one hierarchy, computing and storing in a first computer-readable storage medium of the computer system: a unique relationship number RN as a function of X and Y for each pair of parent-child nodes of said each hierarchy of the at least one hierarchy, wherein X and Y respectively denote the ontology end point of the parent node and the child node of said each pair of parent-child nodes; and computing at least one measure of correlation between the first hierarchy and other information in response to a configuration correlation query that identifies the at least one measure of correlation to be computed, wherein said computing the at least one measure of correlation comprises retrieving and utilizing each stored relationship number of the first hierarchy; and outputting information relating to the computed at least one measure of correlation.

The present invention provides a computer system comprising a processor and a computer readable storage unit coupled to the processor, said storage unit containing computer readable program code that when executed by the processor implements a method for correlating input data comprising correlation data, wherein the correlation data describes at least one hierarchy comprising a first hierarchy, wherein each hierarchy of the at least one hierarchy comprises at least two nodes, wherein the nodes of each hierarchy of the at least one hierarchy each comprise a value and are each designated as an ontology end point consisting of a unique positive integer, said method comprising:

for each hierarchy of the at least one hierarchy, computing and storing in a first computer-readable storage medium of the computer system: a unique relationship number RN as a function of X and Y for each pair of parent-child nodes of said each hierarchy of the at least one hierarchy, wherein X and Y respectively denote the ontology end point of the parent node and the child node of said each pair of parent-child nodes; and computing at least one measure of correlation between the first hierarchy and other information in response to a configuration correlation query that identifies the at least one measure of correlation to be computed, wherein said computing the at least one measure of correlation comprises retrieving and utilizing each stored relationship number of the first hierarchy; and outputting information relating to the computed at least one measure of correlation.

The present invention provides a method and system for correlating information with high efficiency and low computing cost.

BRIEF DESCRIPTION OF THE DRAWINGS

FIG. 4 depicts illustrations of data types which may be used for the nodes of a hierarchy, in accordance with embodiments of the present invention.

FIG. 5 depicts conditional operators that may be used within a condition, in accordance with embodiments of the present invention.

FIG. 14 depicts the Relationship Numbers in FIG. 13 as stored within an Endpoint Ontology Mapping linked list in RAM, in accordance with embodiments of the present invention.

FIG. 16 depicts C source code that derives the integer square root through a bit-shifting approach, in accordance with embodiments of the present invention.

FIGS. 19-24 illustrate byte streams for the processing of the Configuration Data, in accordance with embodiments of the present invention.

FIGS. 25-27 depict multiple preference hierarchies per Node End Point and multiple Node End Points, in accordance with embodiments of the present invention.

FIG. 32 depicts Publication Data information, in the form of Really Simple Syndication (RSS), describing a music file that is available on the Internet, in accordance with embodiments of the present invention.

FIG. 33 depicts a Comparison Data Set in a byte stream format, in accordance with embodiments of the present invention.

FIG. 34 depicts examples of arguments that may be used within a Comparison Data Set, in accordance with embodiments of the present invention.

FIG. 35 depicts a Comparison Data Set that has been derived from the data within the RSS of FIG. 32, in accordance with embodiments of the present invention.

FIG. 38 depicts the Correlation Result Set at two states generated during the processing of the Comparison Data Set via the process of FIG. 36, in accordance with embodiments of the present invention.

FIG. 40 depicts an Alternative Processing Set which contains sufficient aggregate information to resolve a condition, in accordance with embodiments of the present invention.

FIG. 41 depicts exemplary Output Data resulting from the correlation results, in accordance with embodiments of the present invention.

DETAILED DESCRIPTION OF THE INVENTION

Figure 1:
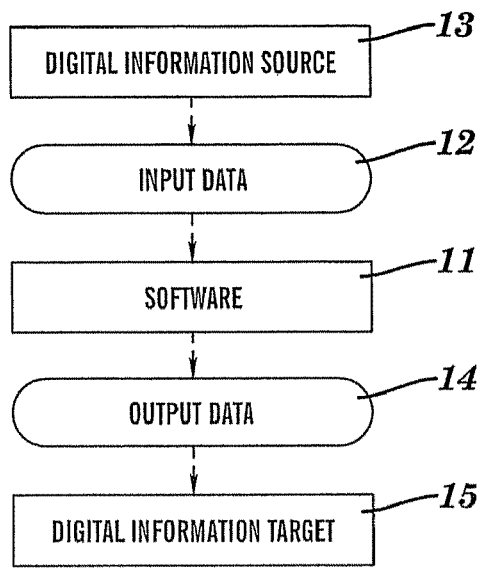
FIG. 1 is a block diagram depicting a flow of data from input data to output data, in accordance with embodiments of the present invention.

FIG. 1 is a block diagram depicting a flow of data from input data 12 to output data 14, in accordance with embodiments of the present invention. A digital information source 13 generates the input data 12 which feeds into software 11. The software 11 utilizes the input data 11 to generate output data 14 (e.g., correlation information) and deliver the output data 14 to a digital information target 15.

The digital information source 13 may be any computing device that is capable of submitting binary data in the form of input data 12 to the software 11.

The input data 12 is structured data provided to the software 11 for use in correlation. The present invention may be implemented with any structured format for input data 12 that can be machine-interpreted.

The output data 14 is structured data which may be used to report correlation results. The present invention may be implemented with any structured format for output data 14 that can be machine-written.

The digital information target 15 may be any computing device that is capable of receiving binary data in the form of output data 14 from the software 11. The digital information source 13 and the digital information target 15 may be the same computing device or different computing devices.

Figure 2:
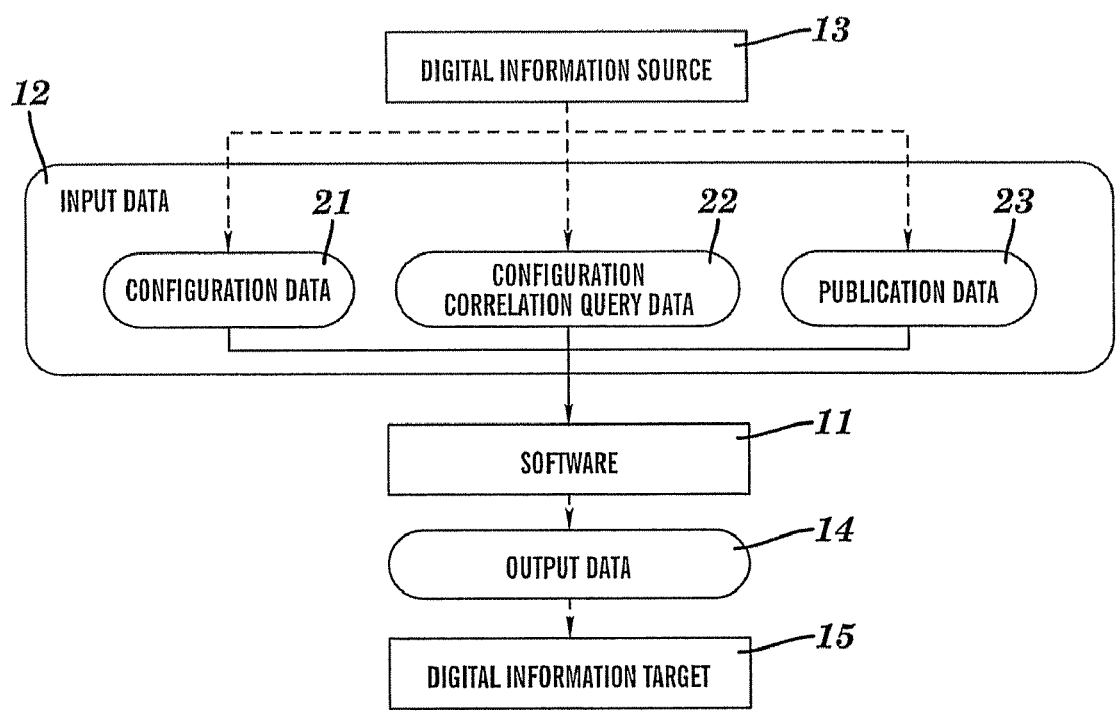
FIG. 2 is the block diagram of FIG. 1 showing the input data as comprising configuration data, configuration correlation query data, and publication data, in accordance with embodiments of the present invention.

FIG. 2 is the block diagram of FIG. 1 showing the input data 12 in more detail, in accordance with embodiments of the present invention. The input data 12 comprises three types of data, namely configuration data 21, configuration correlation query data 22, and publication data 23. The digital information source 13 provides each type of data in a structured format to the software 11. The configuration correlation query data 22 and the publication data 23 are dependent upon the configuration data 21. Therefore, the configuration data 21 is submitted to the software 11 before the configuration correlation query data 22 and the publication data 23 in order for the software 11 to produce correlation results. The type of data submitted to the software 11 determines the correlation processing that the software 11 employs. Therefore, the correlation processing will be described along with each type of input data.

Figure 3:
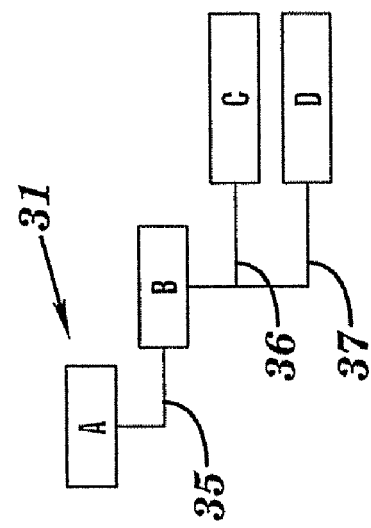
FIG. 3 depicts an illustrative hierarchy described by the configuration data of FIG. 2, in accordance with embodiments of the present invention.

The configuration data 21 may describe a preference hierarchy. FIG. 3 depicts an illustrative hierarchy 31 described by the configuration data 21, in accordance with embodiments of the present invention. The hierarchy 31 comprises a root node A and child nodes B, C, and D. Some of the nodes are connected to each other by relationships 35 (between A and B), 36 (between B and C), and 37 (between B and D). Generally, a hierarchy comprises a root node, child nodes, and hierarchical relationships between the nodes.

Hierarchies may be represented as statements, wherein the nodes are connected by logical operators such as AND, OR, etc. The hierarchy in FIG. 3 may be expressed as the following statement: A AND B AND (C OR D). Each node of a hierarchy may independently be of any data type.

FIG. 4 depicts illustrations of data types which may be used for the nodes of a hierarchy, in accordance with embodiments of the present invention. The data types illustrated in FIG. 4 are (a constant numeric value (101), a constant word (Music), a constant phrase (Berkeley campus), and a condition ($location=Oakland).

Figure 6:
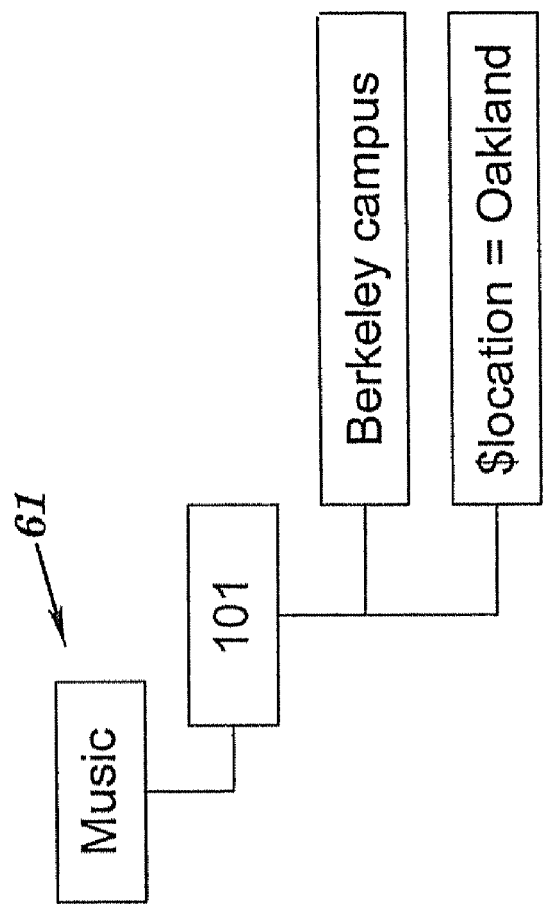
FIG. 6 is an illustrative hierarchy in which the data types of FIG. 4 are used, in accordance with embodiments of the present invention.

A condition may comprise one or more variables, constants, and one conditional operator that, in combination, can evaluate to TRUE or FALSE. FIG. 5 depicts conditional operators that may be used within a condition, in accordance with embodiments of the present invention. The following examples illustrate usage of the conditional operators in FIG. 5, a variable is denoted with a '$' prefix:

1. $a
2. $a=101
3. $a=Music
4. $a=Berkeley campus
5. $a !=101
6. $a !=Music
7. $a !=Berkeley campus
8. $a=$b
9. $a !=$b
10. $a<$b
11. $a>$b
12. $a<=$b
13. $a>=$b
14. $a: 101, Music, Berkeley campus
15. $a !: 101, Music, Berkeley campus FIG. 6 is an illustrative hierarchy 61 in which the data types of FIG. 4 are used, in accordance with embodiments of the present invention. The hierarchy in FIG. 6 may be expressed as the following statement:

Music AND 101 AND (Berkeley campus OR $location=Oakland)

In this example, "Music" is a constant word, "101" is a constant numeric value, "Berkeley campus" is a constant phrase, and "$location=Oakland" is a condition.

The present invention utilizes the following terminology to describe the hierarchy:
1. A hierarchy, as defined by the invention, is a "Preference" or "Preference Hierarchy" (e.g., the Preference or Preference Hierarchy of FIG. 6).
2. Each node within a preference is an "Ontology End Point" (OEP).

Therefore, the hierarchy depicted in FIG. 6, as expressed by the statement:

Music AND 101 AND (Berkeley campus OR $location=Oakland), is a preference, and that preference contains four Ontology End Points, which are: Music, 101, Berkeley campus, and $location=Oakland.

Figure 7:
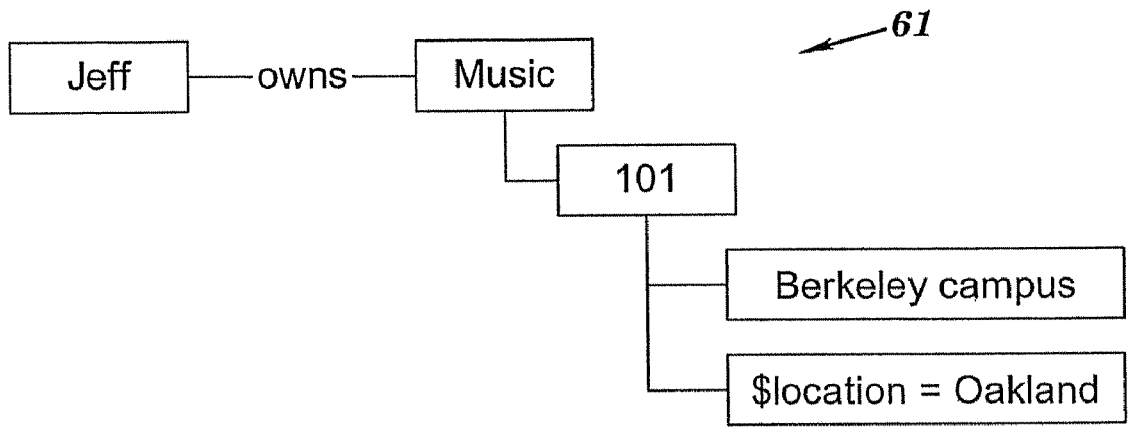
FIG. 7 is the hierarchy of FIG. 6 with addition of the hierarchy's Node End Point, in accordance with embodiments of the present invention.

A Preference (or hierarchy) is assigned ownership. The terminology used to define the owner of a Preference is a "Node End Point" (NEP). FIG. 7 is the Preference or hierarchy 61 of FIG. 6 with the addition of its Node End Point "Jeff", in accordance with embodiments of the present invention. In FIG. 7, the Node End Point "Jeff" is depicted as being connected to the Ontology End Point "Music" which is a root node.

The terminology used to define the ownership between a Node End Point and a Preference is an "Endpoint Ontology Mapping" (OEM). The Endpoint Ontology Mapping is a set of data that contains references to the relationships between the Ontology End Points of a Preference owned by a Node End Point.

Figure 8:
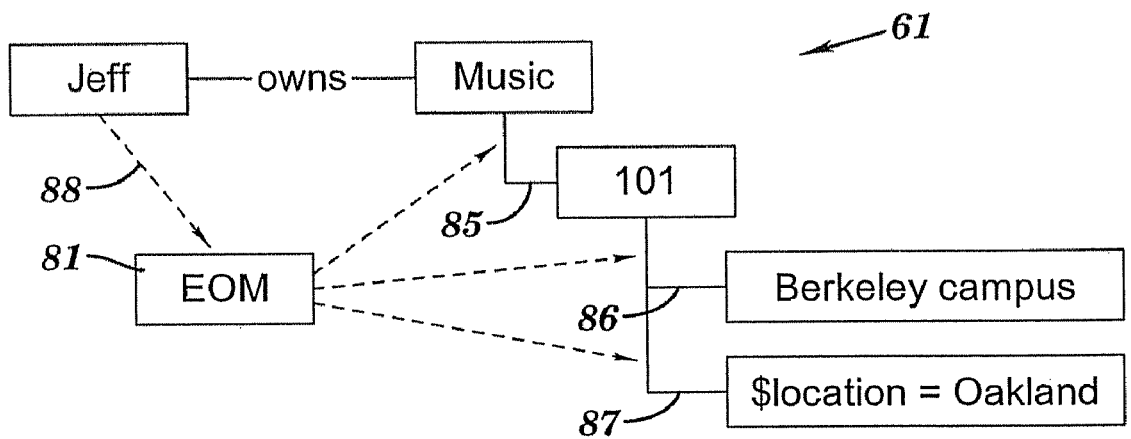
FIG. 8 depicts an Endpoint Ontology Mapping as being a set of data that contains references to the relationships of the hierarchy of FIG. 7, in accordance with embodiments of the present invention.

FIG. 8 depicts an Endpoint Ontology Mapping 81 as being a set of data that contains references to the relationships 85-87 of the hierarchy 61 owned by the Node End Point "Jeff" of FIG. 7, in accordance with embodiments of the present invention. Relationship 85 is between the Ontology End Points of Music and 101. Relationship 86 is between the Ontology End Points of 101 and Berkeley campus. Relationship 87 is between the Ontology End Points of Berkeley campus and $location=Oakland. The relationship 88 between the Node End Point and its Endpoint Ontology Mapping is embodied in a pointer that is a member of a "Node Pointer List" (described infra).

The configuration data 21 of FIG. 2 is described next in conjunction with FIG. 9. The present invention physically stores values for Node End Points, Ontology End Points, and Endpoint Ontology Mappings in such a way as to efficiently utilize the storage and processing to investigate the content of a Preference and compare that content with other information.

Figure 9:
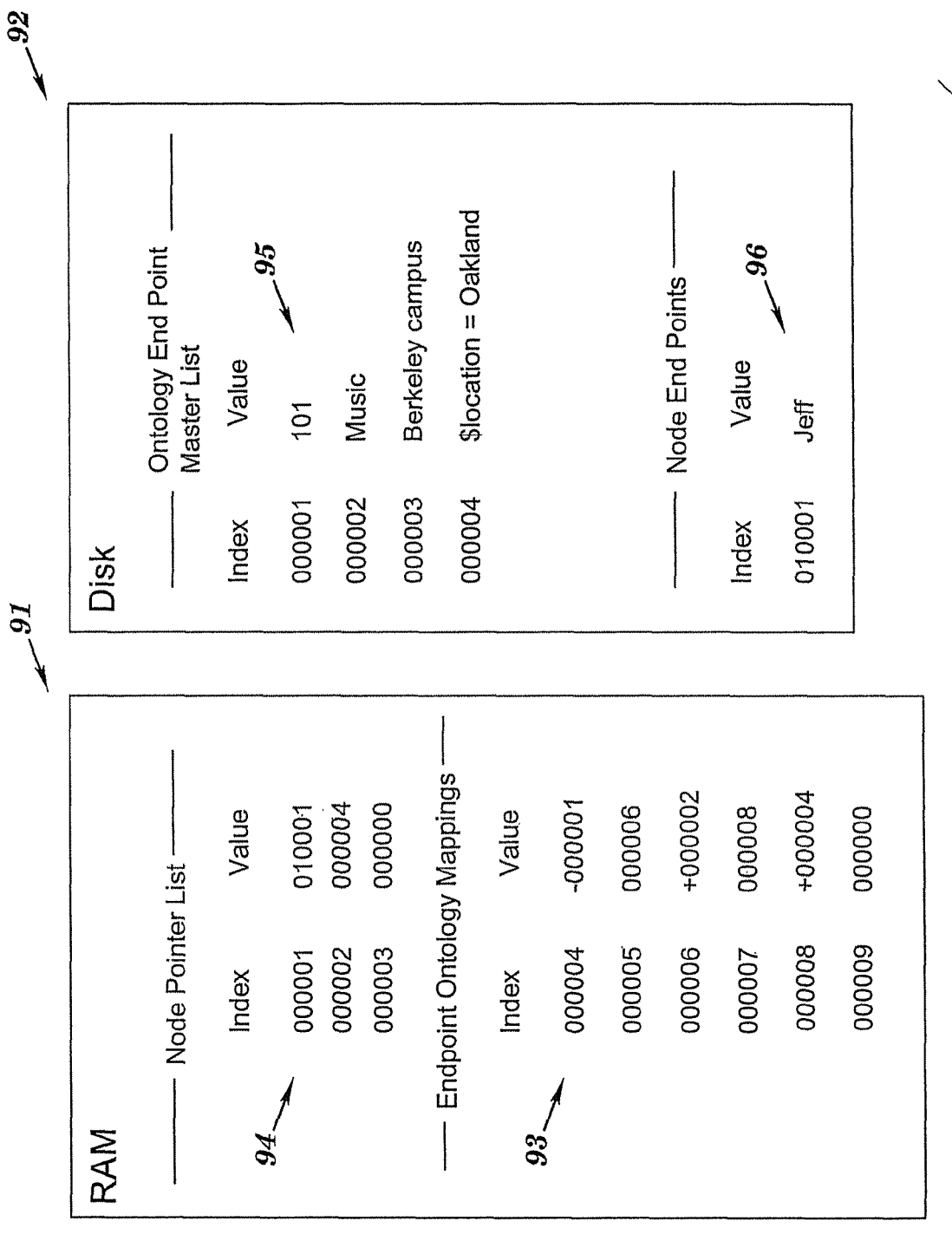
FIG. 9 depicts how information pertaining to the hierarchy in FIG. 8 may be stored in Random Access Memory (RAM) and Disk, in accordance with embodiments of the present invention.

FIG. 9 depicts how information pertaining to the hierarchy 61 in FIG. 8 may be stored in Random Access Memory (RAM) 91 and Disk 92, in accordance with embodiments of the present invention. Disk 92 is a read-write data store outside of RAM 91. Disk 92 may represent a disk such as a hard disk but may generally represent or be replaced by any suitable external computer-readable storage medium such as, inter alia, Bernoulli drive, an optical disc such as a compact disc (CD) or a digital video disc (DVD), etc. RAM 91 comprises a Node Pointer List 94 and Ontology Endpoint Mappings 93. Disk 92 comprises Ontology End Points 95 and Node End Points 96.

The Node Pointer List 94 in RAM 91 generally comprises three (Index,Value) pairs for each Node End Point. In FIG. 9, however, only one such Node End Point is shown, namely the Node End Point of "Jeff", wherein the three indexed pairs in the Node Pointer List 94 are (000001,010001), (00002,000004), and (000003,000000). The value010001in the first pair (00001, 010001) is a pointer serving as an index whose associated value is "Jeff" in the Node End Points 96 list in Disk 92. The value000004in the second pair (00002, 000004) is a pointer serving as an index whose associated value is the relationship number –000001 in the Endpoint Ontology Mappings 93 in RAM 91. The value 000000in the third pair (000003, 000000) is a NULL terminator for the Node End Point "Jeff". The Node End Points 96 are stored in Disk 92 in any, indexed order. These indexes may be any unique value that may be stored in RAM 91 and utilized to retrieve the value of the Node End Point 96 from Disk 92.

The Endpoint Ontology Mappings 93 in RAM 91 is a linked list of relationship numbers –000001, +000002, and +000004, wherein the linked list is NULL terminated by the value of 000000 in the (Index, Value) pair (000009, 000000).

The Ontology End Points 95 in Disk 92 have been extracted from a "Master List" in which each Ontology End Point 95 is assigned a unique, positive integer as its index. The Ontology End Points 95 are stored on Disk 92 in a sequentially-indexed list as shown. Thus in FIG. 9, the Ontology End Points 95 of 101, Music, Berkeley campus, and $location=Oakland have associated index values of000001,000002, 000003, and000004, respectively. Each relationship number in the Ontology Endpoint Mappings 93 is unique and is derived from a pair of Ontology End Points 95 as will be described infra. In one embodiment, the index values used by the Master List begin with the value of 1, and increase by 1 for each Ontology End Point used. The index data type may then be an unsigned integer, as a negative value will not be used, where no bits are wasted.

Although FIG. 9 depicts a particular information storage configuration, the storage pertaining to the hierarchy 61 may be implemented in numerous alternative storage configurations. In one embodiment, the storage (e.g., RAM) utilized for Endpoint Ontology Mappings is available with a minimum of processing instructions.

The Relationship Number is calculated from the index values of the Ontology End Points as described infra in conjunction with FIGS. 10-14.

In order to achieve minimal storage to represent the relationship between two Ontology End Points, the present invention derives a unique number for every possible relationship between two different Ontology End Points within the Master List. This unique number is the Relationship Number. Each relationship having a Relationship Number connects a parent node with a child node, wherein the parent node is higher in the hierarchy than is the child node. For example, the relationship 35 of FIG. 3 connects parent node A with child node B, whereas the relationship 36 connects parent node B with child node C.

Figure 10:
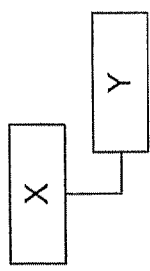
FIG. 10 depicts a hierarchy with X to Y relationships, in accordance with embodiments of the present invention.

For purposes of computing the Relationship Number, the parent node of a relationship is referred to as the X node and the child node of a relationship is referred to as the Y node. FIG. 10 depicts a hierarchy with the X to Y relationship, in accordance with embodiments of the present invention.

Figure 11:
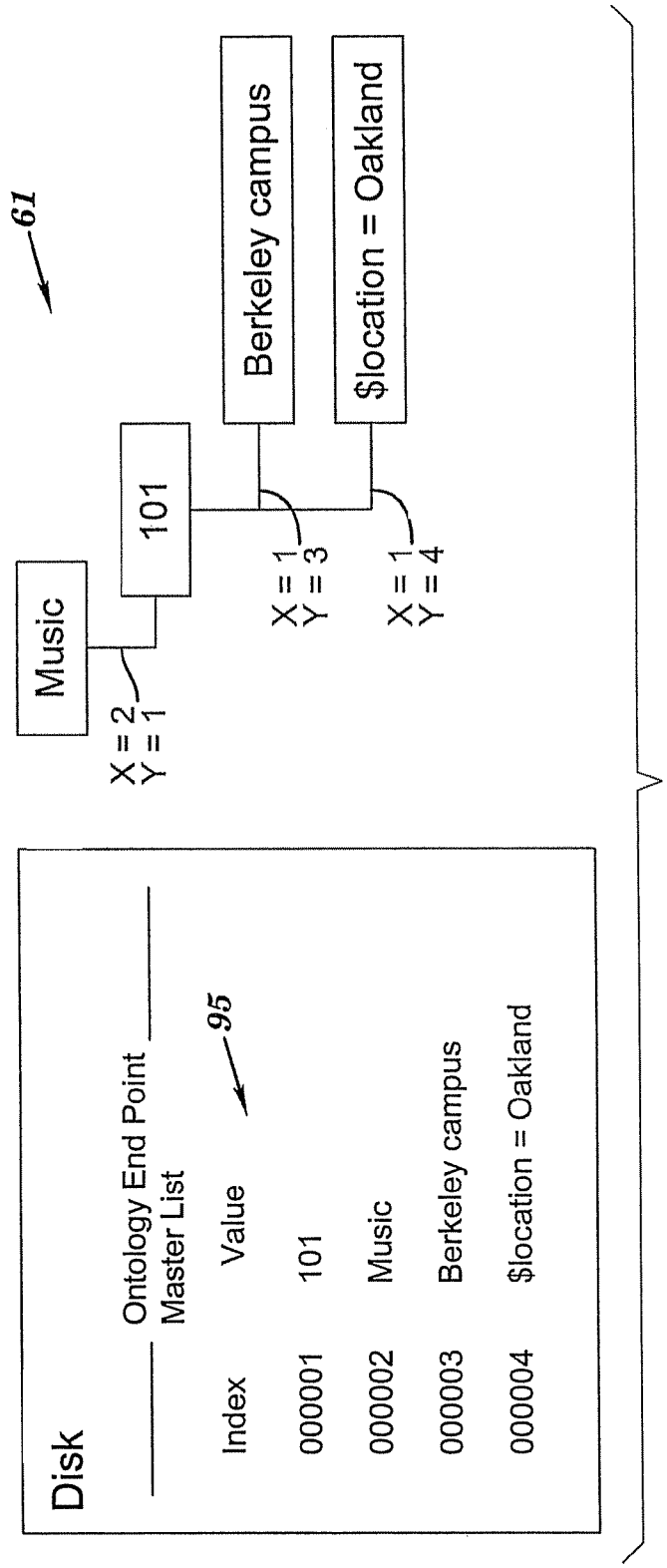
FIG. 11 depicts the four Ontology End Points of FIG. 9 extracted from a Master List and a preference hierarchy that comprises all four of the Ontology End Points, in accordance with embodiments of the present invention.

FIG. 11 depicts the four Ontology End Points 95 (i.e., Music, 101, Berkeley campus, $location=Oakland) of FIG. 9 extracted from a Master List and a preference hierarchy 61 that comprises all four of the Ontology End Points, in accordance with embodiments of the present invention. The hierarchy 61 may be viewed as a set of parent-child relationships, wherein Music is a parent to 101, and 101 is a parent to both "Berkeley campus" and "$location=Oakland". The index values 000001, 000002, 000003, 000004 for the Ontology End Points 95 are referred to as 1, 2, 3, 4, respectively, for simplicity.

For each relationship within the preference hierarchy, the index value of each of the parent and child nodes is retrieved from the Master List. For example, the index value of 101 is 1, the index value of Music is 2, the index value of Berkeley campus is 3, and the index value of $location=Oakland is 4.

In this manner, each relationship of parent-child nodes within the preference hierarchy may be assigned X and Y values from the Ontology End Point index values from the Master List. For example, the relationship of Music (parent) to 101 (child) is X=2 and Y=1. For the relationship of 101 (parent) to Berkeley campus (child), X=1 and Y=3. For the relationship of 101 (parent) to $location=Oakland (child), X=1 and Y=4.

Once X and Y values have been assigned to each relationship, the following formula is utilized to create the unique, Relationship Number (RN) for the X and Y pair:

$$RN=((Y-1)^2-(Y-1))/2+X \qquad (1)$$

wherein Y>X and X and Y are positive integers.

Figures 12, 13:
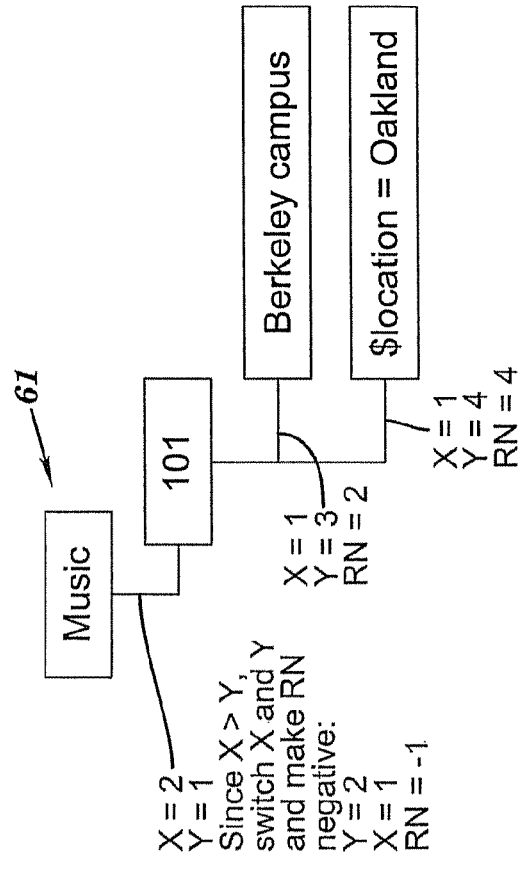
FIG. 12 illustrates relationship numbers for all possible pairings of X and Y (subject to Y>X) for Y=2, 3, 4, 5, . . . , in accordance with embodiments of the present invention.
FIG. 13 depicts the preference hierarchy of FIG. 8 with a unique integer value assigned to every relationship of parent-child nodes as a Relationship Number, in accordance with embodiments of the present invention.

FIG. 12 illustrates relationship numbers, based on Equation (1), for all possible pairings of X and Y (subject to Y>X) for Y=2, 3, 4, 5, . . . , in accordance with embodiments of the present invention. For example, where the value of Y is 5 and the value of X is 4 the Relationship Number, or RN, is 10.

The precedence, or ordinality, of the nodes is indicated by the sign of the Relationship Number. Since it is possible to have a situation where the index value of the Ontology End Point of the parent node is greater than the index value of the Ontology End Point of the child node, or X>Y, the invention may apply the following convention to indicate ordinality:

When X>Y as derived from the hierarchy, the values for X and Y are switched, the value for RN is solved via Equation (1), and RN is made negative (equivalent to multiplication by –1) to indicate that the switch occurred. Therefore, where RN>0, X represents the index value of the Ontology End Point of the parent node and Y represents the index value of the Ontology End Point of the child node. Where, RN<0, Y represents the index value of the Ontology End Point of the parent node and X represents the index value of the Ontology End Point of the child node.

FIG. 13 depicts the preference hierarchy of FIG. 8 with a unique integer values assigned to every relationship of parent-child nodes as a Relationship Number, in accordance with embodiments of the present invention. From the Master List 92 of FIG. 9, the Ontology End Points have index values 1, 2, 3, and 4. In particular, EOM 101 has index value 1; EOM Music has index value 2; EOM Berkeley campus has index value 3; and EOM $location=Oakland has index value 4. The Relationship Numbers shown in FIG. 13 (i.e., RN=−1, RN=2, and RN=4) are calculated as follows.

For the relationship of Music (parent) to 101 (child), X=2 and Y=1. Since X>Y, the X and Y values are switched, and RN is calculated from Equation (1) via: $RN=((2-1)^2-(2-1))/2+1=1$. The resulting value of RN is made negative by being changed to −1 so that the final value for RN is −1.

For the relationship of 101 (parent) to Berkeley campus (child), X=1 and Y=3. Since Y>X, RN is solved without a switch of X and Y, and RN is calculated from Equation (1) via: $RN=((3-1)^2-(3-1))/2+1=2$. The resulting final value of RN is positive, namely RN=2.

For the relationship of 101 (parent) to $location=Oakland (child), X=1 and Y=4. Since Y>X, RN is solved without a switch of X and Y, and RN is calculated from Equation (1) via: $RN=((4-1)^2-(4-1))/2+1=4$. The resulting final value of RN is positive, namely RN=4.

The Preference or hierarchy 61, which may be stated as: "Music AND 101 AND (Berkeley campus OR $location=Oakland)" may be represented by the aforementioned three Relationship Numbers of −1, 2, and 4. These Relationship Numbers are stored in RAM within the Endpoint Ontology Mappings linked list as shown in FIG. 14. Thus, FIG. 14 depicts the Relationship Numbers in FIG. 13 as stored within the Endpoint Ontology Mapping linked list in RAM 93, in accordance with embodiments of the present invention (also shown in FIG. 9, described supra).

In the preceding manner, vast amounts of preference hierarchy data may be stored in RAM and be readily accessed with minimal processing through an index within the Node Pointer List 94 of FIG. 9.

The Relationship Numbers may be decoded to solve for the values of the associated X and Y index values representing the Ontology End Points (i.e., nodes), in order to recreate the preference hierarchy, as described infra in conjunction with FIGS. 15-18.

Figure 15:
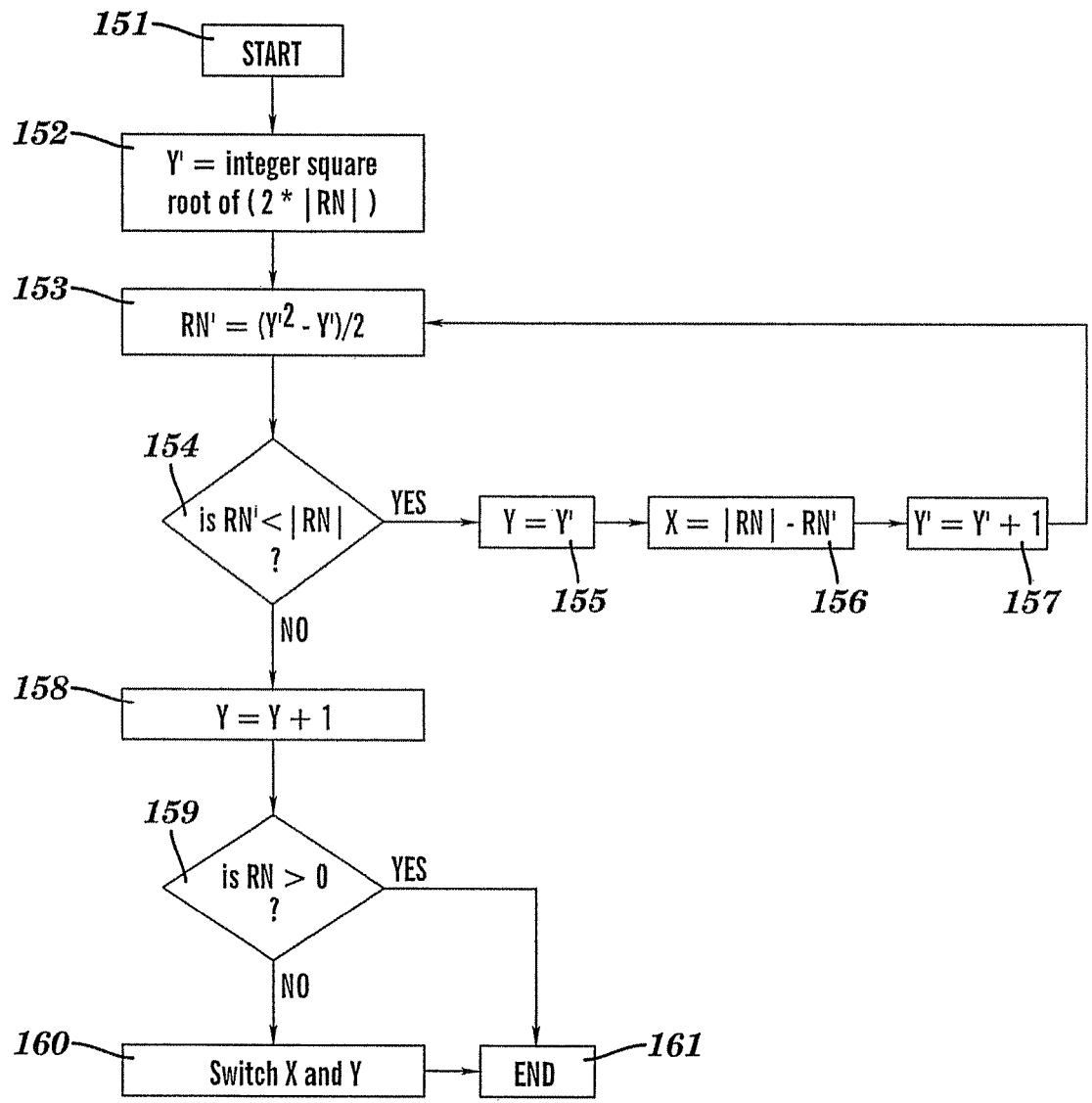
FIG. 15 is a flow chart depicting steps for extracting values X and Y of paired Ontology End Points from a Relationship Number, in accordance with embodiments of the present invention.

FIG. 15 is a flow chart depicting steps 151-161 for extracting values X and Y of paired Ontology End Points from a Relationship Number, in accordance with embodiments of the present invention.

Step 151 initiates processing, starting with a provided Relationship Number (RN). Step 152 calculates Y', which is an approximate value for Y, via Y'=ISQRT(2*|RN|), where ISQRT denotes the integer square root; i.e., the positive square root which, if not an integer, is reduced to an integer by truncation of its decimal or fractional component. For example, if RN=8 then Y'=4 since the square root of 2*8 is 4. If RN=12 then Y'=4 since the square root of 2*12 is 4.90 and the 0.90 is truncated to yield Y'=4.

Step 153 calculates $RN'=(Y'^2-Y')/2$.

Step 154 determines whether RN'<|RN|. The first calculation of RN' will always result in RN' being less than |RN|.

If step 154 determines that RN'<|RN| then steps 155-157 are next executed, followed by looping back to step 153; otherwise step 158 is next executed. Step 155 calculates Y=Y', step 156 calculates X=|RN|−RN', and step 157 increments Y' by 1.

Step 158 increments Y by 1.

Step 159 determines whether RN>0.

If step 159 determines that RN>0 then the process ends in step 161; otherwise step 160 switches X and Y to produce the proper ordinality of X relative to Y, followed by ending the process in step 161.

FIG. 16 depicts C source code that derives the integer square root through a bit-shifting approach, in accordance with embodiments of the present invention. Any algorithm that efficiently derives the closest integer square root, which is less than the actual square root, may be utilized.

Using the algorithm of FIG. 15, the three Relationship Numbers (−1, 2, 4) in FIG. 13 will next be decoded to yield X and Y.

Solving X and Y from RN=−1:
1. The integer square root of |−1|*2 is 1. Therefore Y'=1.
2. $RN'=(1^2-1)/2=0$.
3. Since 0<|−1| in step 154, Y=Y'=1, and X=|−1|−0=1.
4. Y' is incremented by 1 to yield Y'=2 and $RN'=(2^2-2)/2=1$.
5. Since 1=|−1| in step 154, step 158 is next executed.
6. Y=Y+1=1+1=2
7. Since RN<0 in step 159, X and Y are switched.
8. The final result is X=2 and Y=1.

Solving X and Y from RN=2:
1. The integer square root of |2|*2 is 2. Therefore Y'=2.
2. $RN'=(2^2-2)/2=1$.
3. Since 1<|2| in step 154, Y=Y'=2, and X=|2|−1=1.
4. Y' is incremented by 1 to yield Y'=3 and $RN'=(3^2-3) 2=3$.
5. Since 3>|2| in step 154, step 158 is next executed.
6. Y=Y+1=2+1=3.
7. Since RN>0 in step 159, X and Y are not switched.
8. The final result is X=1 and Y=3.

Solving X and Y from RN=4:
1. The integer square root of |4|*2 is 2. Therefore Y'=2.
2. $RN'=(2^{2-2})/2=1$.
3. Since 1<|4| in step 154, Y=Y'=2, and X=|4|−1=3.
4. Y' is incremented by 1 to yield Y'=3 and $RN'=(3^2-3) 2=3$.
5. Since 3<|4| in step 154, Y=Y'=3, and X=|4|−3=1.
6. Y' is incremented by 1 to yield Y'=4 and $RN'=(4^2-4) 2=6$.
7. Since 6>|4| in step 154, step 158 is next executed.
8. Y=Y+1=3+1=4.
9. Since RN>0 in step 159, X and Y are not switched.
10. The final result is X=1 and Y=4.

Figure 17:
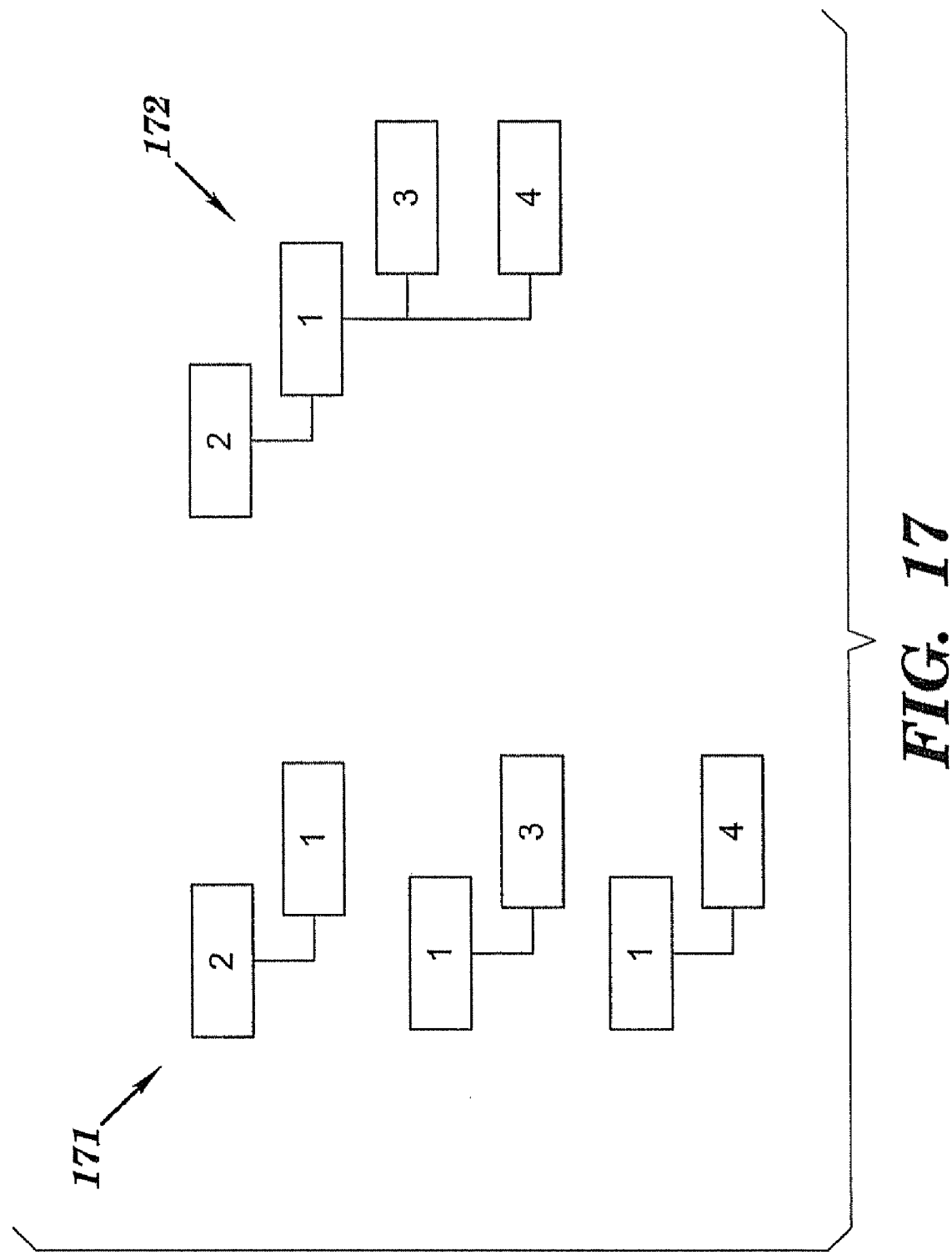
FIG. 17 depicts three parent-child relationships and a resultant hierarchy from the (X,Y) pairs calculated for the Relationship Numbers of FIG. 13, in accordance with embodiments of the present invention.

FIG. 17 depicts three parent-child relationships 171 and a resultant hierarchy 172 from the (X,Y) pairs (2,1), (1,3), and (1,4) calculated supra for the Relationship Numbers of −1, 2, and 4, respectively, of FIG. 13, in accordance with embodiments of the present invention.

Figure 18:
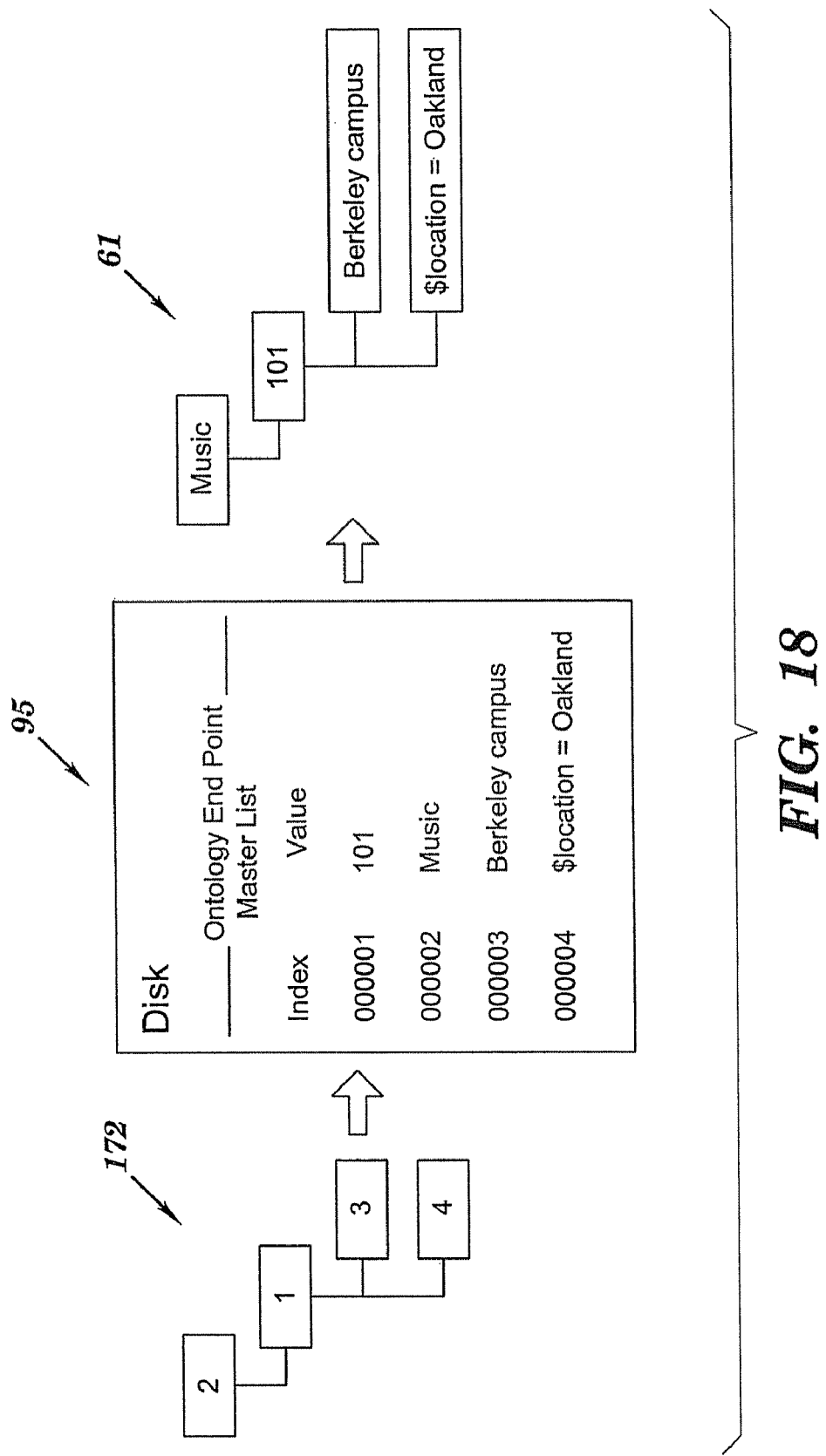
FIG. 18 depicts a transformation of the hierarchy of FIG. 17 into the preference hierarchy of FIG. 6 by using the Ontology End Points from the Master List as shown in FIG. 9, in accordance with embodiments of the present invention.

FIG. 18 depicts a transformation of the hierarchy 172 of FIG. 17 into the preference hierarchy 61 of FIG. 6 by using the Ontology End Points 95 from the Master List as shown in FIG. 9, in accordance with embodiments of the present invention.

In the preceding manner of decoding the Relationship Numbers, the present invention recreates the preference hierarchy with minimal processing. This makes a storage mechanism based upon Relationship Numbers practical.

To illustrate storage capabilities, consider the following example, utilizing linked lists as the storage mechanism:

If the average preference hierarchy consists of 21 nodes and, therefore, 20 Endpoint Ontology Mappings (i.e., 20 relationship numbers), and if 64 bits (two, 32-bit integers) are utilized for each Endpoint Ontology Mapping, then the RAM required to store each Preference is as follows.

Size of Preference in RAM=64 bits*20, or 1280 bits. At 8 bits per Byte, 1024 Bytes per Kilobyte, $10^6$ Kilobytes per Gigabyte, the number of Preferences that can be stored in 1

GB is: 1 GB/(1280 bits/Preference))*(8 bits/B)*(1024 B/KB) *(10⁶ KB/MB)=6,400,000 Preferences.

If an average number of Preferences per Node End Point is assumed to be 10, then 1 GB of RAM will support 640,000 Node End Points (i.e., 6,400,000/10).

If each Node End Point requires 96 bits (three, 32-bit integers) in the Node Pointer List of FIG. 9, then the RAM required for storing 640,000 NEPs is:

640,000 NEP*96 bits/(8 b/B)/(1024 B/KB*1000 KB/B*1000 MB/GB)=0.0075 GB

If a Node End Point represents a system User, then a single computing platform with 16 GB of RAM available for Configuration Data would support up to 10,163,771 Users who have expressed an average of 10 Preferences, each having an average of 21 nodes, in a manner such that each User's Preference data is immediately available in RAM.

As depicted in FIG. 2, the Configuration Data 21 of the Input Data 12 is received from a Digital Information Source 13. Any implementation of the Configuration Data 21 as structured data will work, as illustrated infra with delimited byte streams.

FIGS. 19-24 illustrate byte streams for the processing of the Configuration Data, in accordance with embodiments of the present invention.

FIG. 19 depicts a byte stream which may be interpreted to create an Ontology End Point. The structure of the byte stream of FIG. 21 may be described as follows:
1. The first element of the byte stream, "config" indicates that Configuration Data is being received.
2. The second element of the byte stream, "oep" indicates the type of Configuration Data to be acted upon, namely in this case: Ontology End Point data.
3. The third element of the byte stream, "create" indicates the action to be performed with respect to the Configuration Data (e.g., create or delete).
4. The subsequent elements of the byte stream (in this case, there is one element, "Music") are the Ontology End Points to which the action (create) of the third element applies.
5. The elements of the byte stream are delimited by a reserved character, '>'.

FIG. 20 depicts a byte stream that utilizes an "escaped" character sequence to represent the '>' character, which is reserved as the byte stream delimiter. Where the value of '>' is to be utilized within any of the elements of the byte stream, it may be represented as a reserved character sequence, or escaped as ">". For example, the condition, "$a>$b" is expressed as "$a > $b". Internally, once the byte stream has been parsed, the invention may transpose the escaped sequence, ">" to '>' if the implementation requires. (Such a convention requires that the "&" character is also escaped, which may be represented as "&" as is a common practice.)

FIG. 21 depicts a byte stream which may be interpreted to create multiple Ontology End Points. The structure of the byte stream may be described as follows:
1. "config" indicates that the byte stream contains Configuration Data.
2. "oep" indicates that the type of Configuration Data is Ontology End Point.
3. "create" indicates that the required action is to create instances of the Ontology End Points.
4. all remaining elements are inserted into the Master List.

FIG. 22 depicts a byte stream which may be interpreted to delete an Ontology End Point. The structure of the byte stream may be described as follows:
1. "config" indicates that the byte stream contains Configuration Data.
2. "oep" indicates that the type of Configuration Data is Ontology End Point.
3. "delete" indicates that the required action is to delete instances of the Ontology End Points.
4. all remaining elements in the byte stream are deleted from the Master List. In this case, the Ontology End Point 101 would be removed.

Since Ontology End Points are referred to by Endpoint Ontology Mappings, an embodiment of the present invention may provide referential integrity processing such as preventing the deletion from occurring until all associated Endpoint Ontology Mappings have been removed, or removing all associated Endpoint Ontology Mappings automatically upon the deletion of the Ontology End Point.

FIG. 23 depicts a byte stream which may be interpreted to create a Node End Point. The structure of the byte stream may be described as follows:
1. "config" indicates that the byte stream contains Configuration Data.
2. "nep" indicates that the type of Configuration Data is Node End Point.
3. "create" indicates that the required action is to create instances of the Node End Points.
4. All remaining elements are added to the Node End Point list.

The third element in FIG. 23 may contain the value "delete", which would indicate that the Node End Point should be removed from the Configuration Data. Since Node End Points refer to Endpoint Ontology Mappings, an embodiment of the present invention may provide referential integrity processing such as preventing the deletion from occurring until all associated Endpoint Ontology Mappings have been removed, or removing all associated Endpoint Ontology Mappings and associated entries in the Node Pointer List automatically upon the deletion of the Node End Point.

FIG. 24 depicts a byte stream which may be interpreted to create Endpoint Ontology Mappings. The structure of the byte stream may be described as follows:
1. "config" indicates that the byte stream contains Configuration Data.
2. "eom" indicates that the type of Configuration Data is Endpoint Ontology Mapping.
3. "create" indicates that the required action is to create instances of the Endpoint Ontology Mappings.
4. "Jeff" indicates the associated Node End Point for the Endpoint Ontology Mappings.
5. The remaining elements are processed as X and Y pairs of preference hierarchy nodes, the sequence indicating ordinality, where X precedes Y.

The third element of FIG. 24 may contain the value "delete", which would indicate that the Endpoint Ontology Mappings should be removed from the Configuration Data. The byte stream would be expected to present the X and Y values of the relationship to be removed as the remaining elements.

The byte stream depicted in FIG. 24 contains the minimum amount of information that the invention requires to create Configuration Data and process queries against it, including a Node End Point, a set of more than two Ontology End Points, and a preference hierarchy having more than two nodes. Therefore, the implementation of the invention may elect to use such a byte stream to create all of the Configuration data rather than create Node End Points and Ontology End Points separately and apart from Endpoint Ontology Mappings.

Figure 25:
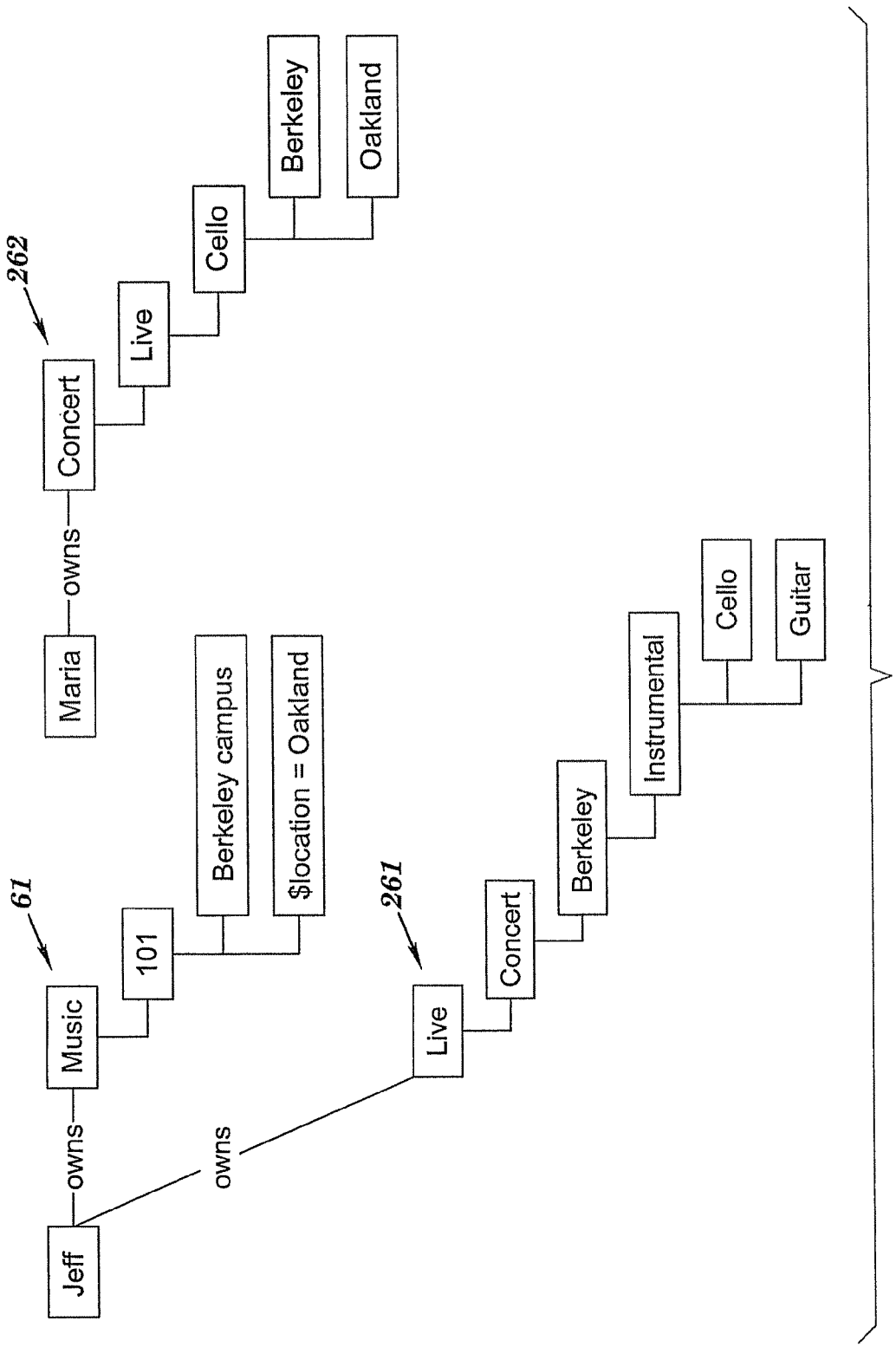

FIGS. 25-27 depict multiple preference hierarchies per Node End Point and multiple Node End Points, in accordance with embodiments of the present invention.

FIG. 25 depicts three preference hierarchies, namely: the preference hierarchy 61 owned by NEP "Jeff" and having the root node "Music"; the preference hierarchy 261 owned by NEP "Jeff" and having the root node "Live"; and the preference hierarchy 262 owned by NEP "Maria" and having the root node "Concert";

The Preferences for Jeff comprises Preference Hierarchies 61 and 261 and can be stated as: [Live AND Concert AND Berkley AND Instrumental AND (Cello OR Guitar)] and [Music AND 101 AND (Berkeley campus OR $location=Oakland)].

The Preference for Maria comprises Preference Hierarchy 262 and can be stated as: Concert AND Live AND Cello AND (Berkeley OR Oakland).

FIG. 26 depicts the organization of Configuration Data in storage for the preference hierarchies 61 and 262 of FIG. 25. Compared with the description of storage as illustrated in FIG. 9 (which only contains the Node End Point of Jeff) for the preference hierarchy 61 depicted in FIG. 6, the Configuration Data has been expanded with additional Ontology End Points within the Master List, the additional Node End Point of Maria, an additional structure within the Node Pointer list for Maria, and the additional Endpoint Ontology Mapping structures to describe the new preference hierarchy 262.

On Disk, the Node End Point of "Maria" had been added at index 010002. Also, the new Ontology End Points have been added to the Master List, beginning with "Live" at index 5 and ending with "Guitar" at index 000011.

In RAM, the Node Pointer List has two members, Jeff and Maria. The member Jeff has three elements at indexes 000001, 000002, and 000003 in the Node Pointer List. The member Maria has three elements at indexes 000010, 000011, and 000012 in the Node Pointer List. The third element of member Jeff in the Node Pointer List at index 000003 no longer has a value of 000000 as in FIG. 9, but instead has a value of 000010 that refers to the first element of the next member Maria of the Node Pointer List at index 000010 having value 010002 that is the index for the Node End Point "Maria" on disk. The second element of the next member Maria of the Node Pointer List at index 000011 having value 000013 is an index pointing to the first Endpoint Ontology Mapping for "Maria". The third element of the next member Maria of the Node Pointer List at index 000012 having value 000000 indicates the end of the NULL-terminated Node Pointer List.

Also in RAM, new Endpoint Ontology Mappings 261 and 262 of FIG. 25 have been created. The Endpoint Ontology Mappings at indexes 000004-000009 for "Jeff" have not changed relative to FIG. 9. In addition, there are Endpoint Ontology Mappings at indexes 000013-000020 for "Maria". The Endpoint Ontology Mappings list is NULL-terminated at index 000020 with a value of 000000.

FIG. 27 depicts the organization of Configuration Data in storage once the new preference hierarchy 261 for Jeff has been added. Note that the Node Pointer List in RAM in FIG. 27 is unchanged from the Node Pointer List in RAM in FIG. 26, because the Node Pointer List need refer to only the first Endpoint Ontology Mapping owned by each Node End Point.

In the Endpoint Ontology Mappings list in RAM in FIG. 27, the last element at index 000009 for hierarchy 61 owned by Jeff has value 000021, which is an index pointing to the first Endpoint Ontology Mapping of the hierarchy 261 owned by Jeff. The Endpoint Ontology Mappings of the hierarchy 261 owned by Jeff encompass indexes 000021-000030.

The Master List on disk in FIG. 27 is unchanged from the Master List on disk in FIG. 26, because the there are no new Ontology End Points in the hierarchy 261 as compared with the combination of hierarchies 61 and 262 represented in FIG. 26.

The Node End Points on disk in FIG. 27 is unchanged from the Node End Points on disk in FIG. 26, because there are no new Node End Points in FIG. 27 as compared with FIG. 26.

While the storage of configuration data in FIG. 27 utilizes linked lists, the configuration data could be stored in accordance with any other applicable storage scheme. For example, the relationship numbers for each hierarchy could be stored sequentially in an array.

The configuration correlation query data 22, which is comprised by the input data 12 (see FIG. 2), may be processed and utilized to provide useful information about the Preferences described within the Configuration Data as described infra in conjunction with FIGS. 28-31.

With the Configuration Data containing more than one Preference, it is possible to submit Configuration Correlation Query Data and achieve the creation of meaningful Output Data from the method of the present invention.

Configuration Correlation Query Data serves to derive meaningful information from the Configuration Data itself. For example, the Configuration Correlation Query Data may be used to know how many Node End Points there are in the system, or how many Node End Points have more than one Preference, or how Preferences compare in terms of common relationship numbers or node values.

The Configuration Correlation Queries invoked by the Configuration Correlation Query Data may provide at least one query identifier and at least one output identifier. An example of Configuration Correlation Query Data is "query>nep>default", which contains three elements:

1. An identifier of the query itself; in this example, the word "query" indicates that this is Configuration Correlation Query Data.
2. The name of the query to be executed; in this example the query is named "nep."
3. The format for the output; in this example, the format is named "default."

Figure 28:
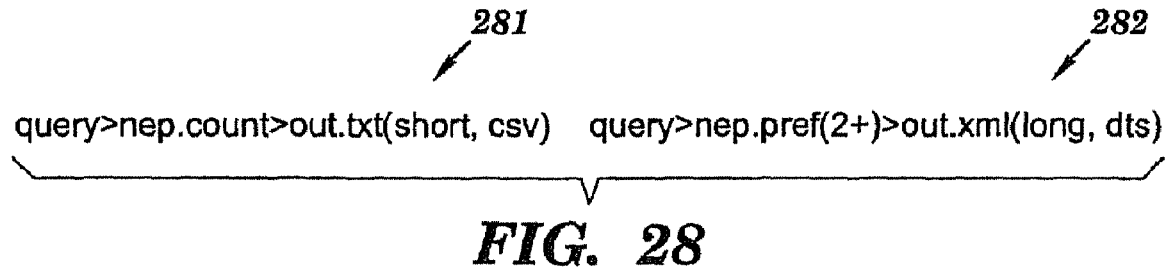
FIG. 28 depicts byte streams that may be used to represent Input Data for Configuration Correlation Data Queries, in accordance with embodiments of the present invention.

FIG. 28 depicts byte streams 281 and 282 that may be used to represent Input Data for Configuration Correlation Data Queries, in accordance with embodiments of the present invention. Any meaningful, structured data format may be implemented as Input Data for Configuration Correlation Data Queries.

The byte stream 281 comprises a Configuration Correlation Data Query that asks: "how many Node End Points there are in the system?" (as dictated by "nep.count") and request the output to be in the form of text, with shortened output in a comma-separated value format (as dictated by "out.txt (short,csv)").

The byte stream 282 comprises a Configuration Correlation Data Query that asks: "how many Node End Points have more than one Preference?" (as dictated by "nep.pref(2+)") and request the output to be in the form of xml, with verbose output that includes a date-time-stamp (as dictated by "out.xml(long,dts)").

Generally, the query identifier and output identifier within the Configuration Correlation Data Queries may take any form that may be interpreted to execute a desired query and return the results in a desired format. Any number of Configuration Correlation Queries may be processed in accordance with the present invention.

Each query resides within a Configuration Correlation Query Store and is executed by the receipt of Configuration Correlation Query Data. The results of executing the query are sent as Output Data produced in a format that is specified or in a default format.

Figure 29:
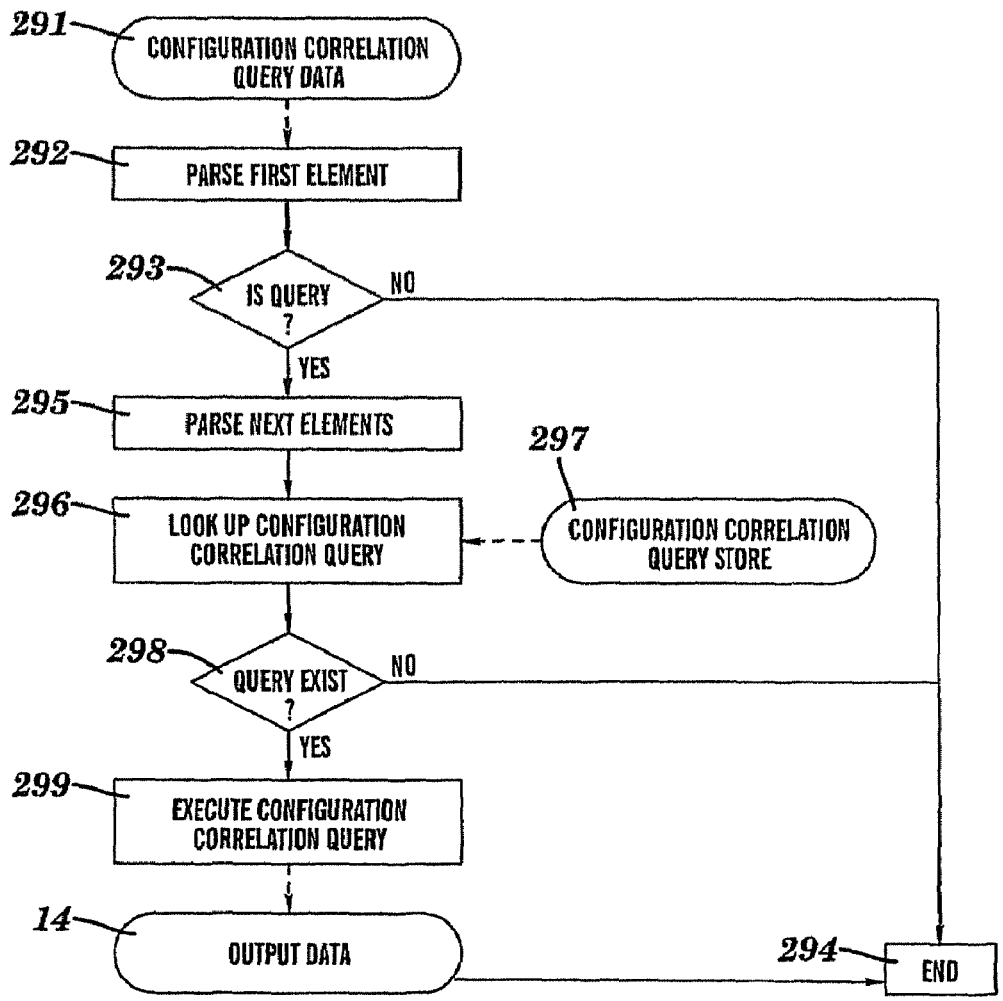
FIG. 29 is a flow chart depicting how Configuration Correlation Query Data is processed, in accordance with embodiments of the present invention.

FIG. 29 is a flow chart depicting how Configuration Correlation Query Data is processed, in accordance with embodiments of the present invention.

In step 291, the Configuration Correlation Query Data 22 (see FIG. 2) is received.

In step 292, the first element is extracted from parsing the Configuration Correlation Query Data.

Step 293 determines whether the first element indicates that the data is a Configuration Correlation Query. If step 293 determines that the data is a Configuration Correlation Query, then the process continues with step 295; otherwise, the process ends. at step 294.

In step 295, the remaining elements (i.e., the query identifier and the output format identifier—see FIG. 28 and discussion thereof supra) are parsed.

In step 296, an attempt is made to retrieve the query from the Configuration Correlation Query Store 297, which would validate both the query and the output format that are requested.

Step 298 determines whether the query was retrieved in step 296. If step 298 determines that the query was so retrieved, then the process continues at step 299; otherwise, the process ends at step 294.

In step 299, the retrieved Configuration Correlation Query is executed, followed by producing Output Data 14 in the format determined from step 295.

The process ends in step 294.

Figure 30:
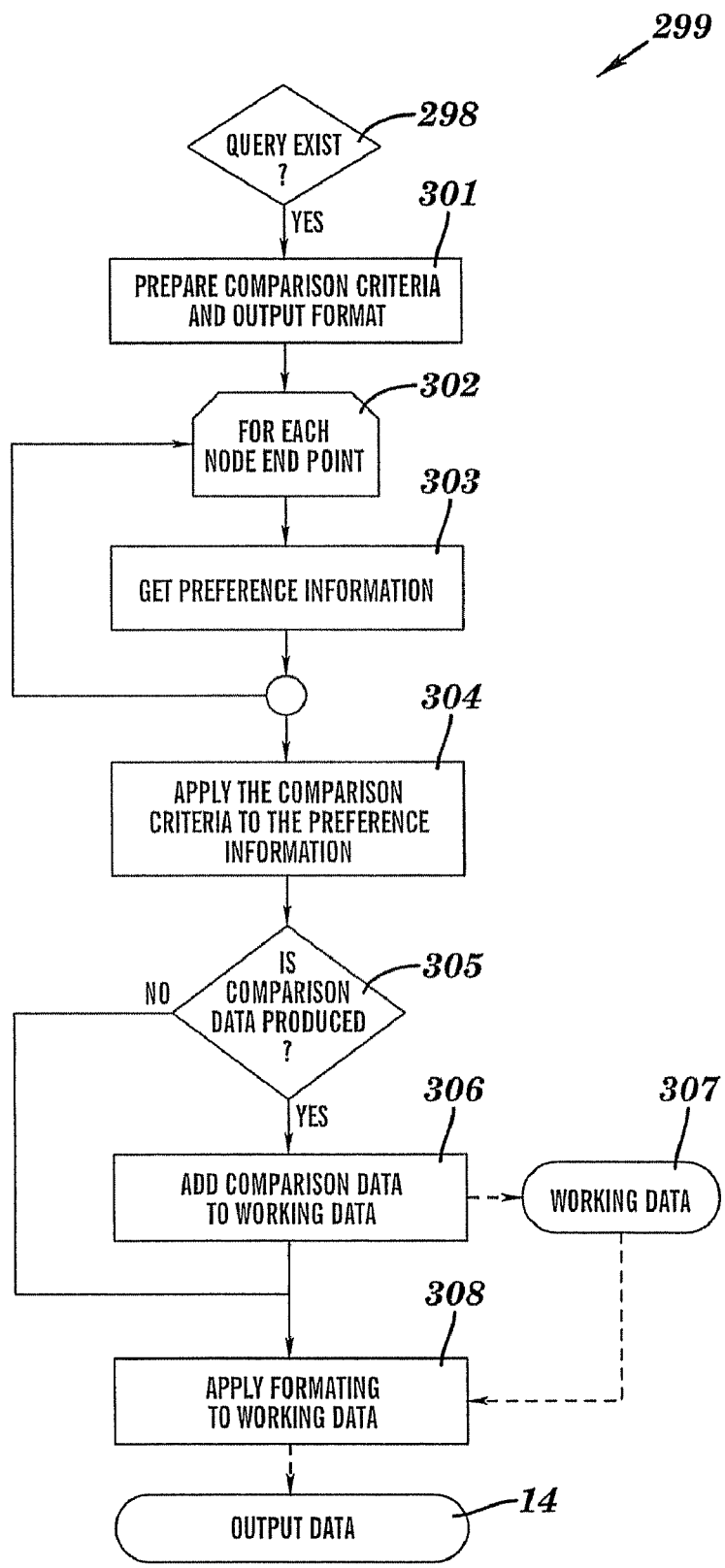
FIG. 30 is a flow chart that describes in more detail the execution of the Configuration Correlation Query in FIG. 29, in accordance with embodiments of the present invention.

FIG. 30 is a flow chart that describes in more detail the execution of the Configuration Correlation Query in step 299 of FIG. 29, in accordance with embodiments of the present invention. The process may be described as follows.

Step 301 prepares the comparison criteria and output format information from the Configuration Correlation Query.

Steps 302 and 303 define a loop over those Node End Points delineated explicitly or by default in the Configuration Correlation Query being processed. Thus, the loop of steps 302-303 may be over any subset of the Node End Points in the Node Pointer List (see FIG. 27). In the absence of an explicit specification of Node End Points in the Configuration Correlation Query being processed, the default may be that the loop of steps 302-303 may be over all Node End Points in the Node Pointer List.

The preference hierarchy information for each Node End Point is gathered from the Endpoint Ontology Mappings, or from recreating the Preference Hierarchies from the Endpoint Ontology Mappings. An example of where the Preference Hierarchies do not need to be recreated is a query where only relationships are being compared. In this case, since the relationship numbers may be compared to achieve correlation between the preference hierarchies, there is no need to recreate the Ontology End Points to achieve the same result.

Step 304 applies the comparison criteria to the Preference information (e.g., to calculate percentage overlap between preference hierarchies).

Step 305 determines whether comparison data is produced from applying the comparison criteria. If step 305 determines that comparison data is produced from applying the comparison criteria, then in step 306 the comparison data is added to a working data set 307 that accrues the query results.

Step 308 applies the requested formatting to the working data to produce the Output Data 14 (see FIG. 2).

Figure 31:
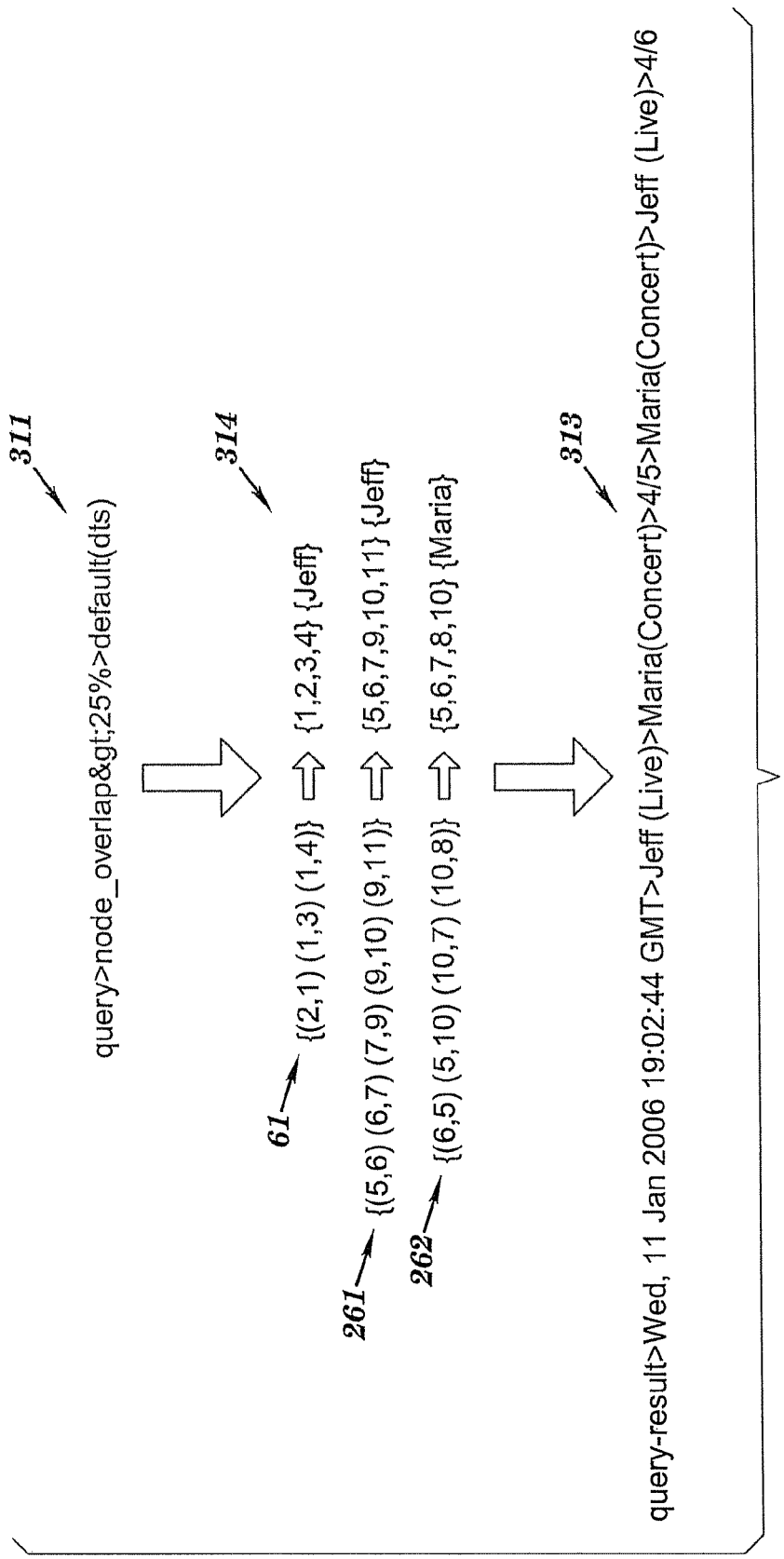
FIG. 31 depicts Configuration Correlation Query Data, Preference Hierarchies of FIGS. 25 and 27, the associated node indexes, and the Output Data resulting from processing the query, in accordance with embodiments of the present invention.

FIG. 31 depicts Configuration Correlation Query Data 311, three Preference Hierarchies 61, 261, and 262 (see FIGS. 25 and 27), the associated node indexes 314 (i.e., Ontology End Point indexes), and the Output Data 313 resulting from processing (including executing) the query derived from the Configuration Correlation Query Data 311, in accordance with embodiments of the present invention.

The query inquires as to where (if any) there is greater than (>) 25 percent overlap between the nodes (i.e., common node values) of two Preference Hierarchies. The format of the Output Data is to be a default and is to include a date-time-stamp (default(dts)).

Using the data in FIG. 27 for the preference hierarchies of Jeff (61 and 261) and Maria 262, and the algorithm described supra for decoding relationship numbers, a list of nodes 314 is created for each hierarchy. A comparison of the nodes of each two hierarchies (of the tree hierarchies 61, 261, and 262) reveals that the query has a positive answer (Yes or True) for two pairs of hierarchies as follows.

4 nodes (5, 6, 7, 10) of the nodes (5, 6, 7, 9, 10, 11) of Jeff's Preference Hierarchy 261 overlap the 5 nodes (5, 6, 7, 8, 10) of Maria's Preference Hierarchy 262, and 4/5 exceeds the 25% threshold.

4 nodes (5, 6, 7, 10) of the nodes (5, 6, 7, 8, 10) of Maria's Preference Hierarchy 262 overlap the 6 nodes (5, 6, 7, 9, 10, 11) of Jeff's Preference Hierarchy 261, and 4/6 exceeds the 25% threshold.

Both the 4/5 and the 4/6 correlations are produced within the Output Data 313, as shown in FIG. 31.

Similarly, any query against the Configuration Data may be introduced and processed in accordance with the methodology of the present invention.

In addition to providing methodology for computing correlations between hierarchies of the Configuration Data 10, the present invention provides methodology for computing correlations between the Configuration Data 21 and Publication Data 23 (see FIG. 2).

Publication Data is transient information that is provided for the purpose of discovering correlation between content of the Publication Data and the Preferences of the Configuration Data, wherein the correlation results may be produced in the form of Output Data. Publication Data may be derived from structured or unstructured data.

FIG. 32 depicts Publication Data information, in the form of Really Simple Syndication (RSS), describing a music file that is available on the Internet, in accordance with embodiments of the present invention.

An example demonstrating motivation for utilizing such Publication Data information for correlation is that the Node End Point, "Jeff" may represent an individual who is interested in receiving the music file of FIG. 32 if there is strong correlation between his Preference and the descriptive data about the music file within the RSS shown in FIG. 32.

Publication Data provided in a structured format as input to the methodology and algorithms of the present invention is called a Comparison Data Set (CDS). A Comparison Data Set may be derived from Publication Data information such as the RSS in FIG. 32.

FIG. 33 depicts a Comparison Data Set in a byte stream format, in accordance with embodiments of the present invention. The elements of the Comparison Data Set of FIG. 33 are defined as follows:

"pub" is a constant value indicating that the byte stream is Publication Data.

"item-id" is a unique value that will be returned within the Output Data 14 to enable the Digital Information Target 15 to associate the correlation results with the originating Input Data 12 from the Digital Information Source 13 (see FIG. 2).

"arg1", "arg2", "arg3", . . . , "argN" is the first argument, the second argument, the third argument, . . . , the $N^{th}$ argument, respectively, within the Comparison Data Set.

The Comparison Data Set comprises at least one argument. There is no logical limit to the number of arguments. However, the number of arguments may be limited by physical constraints, such as the amount of data permitted during data transfer as Input Data 12 between the Digital Information Source 13 and the Software 11 (see FIG. 1).

FIG. 34 depicts examples of arguments that may be used within a Comparison Data Set, in accordance with embodiments of the present invention. An argument within the Comparison Data Set may take the form of any of the supported data types utilized for the Ontology End Point (e.g., see FIG. 4 and discussion thereof supra). In addition, an argument may take the form of a Mapped Value, where one variable is mapped to a constant value, or where a reserved word that defines special processing to be implemented by the software, is mapped to a constant value. The constant value in either case may be of any data type. For this example, a reserved word may be denoted by the prefix "!".

FIG. 35 depicts a Comparison Data Set that has been derived from the data within the RSS of FIG. 32, in accordance with embodiments of the present invention. The derivation of the Comparison Data Set of FIG. 35 uses the following elements from the RSS of FIG. 32:

1. <pubDate> 321
2. <title> 322
3. <description> 323
4. <category> 324

In keeping with the byte-stream convention, the first element is a constant value, "pub" that indicates that the byte stream is a Comparison Data Set.

Then, a unique, item-id value is assigned to the Comparison Data Set, so that correlation results may be traced back to the original RSS. For this, the information from the <title> element 322 has been concatenated to the information from the <pubDate> element 321, resulting in the item-id value: "Wed, 11 Jan 2006 20:11:44 GMT Live Music Podcast".

The Comparison Data Set is now: "pub>Wed, 11 Jan 2006 20:11:44 GMT Live Music Podcast" and ready to have arguments added.

It may be desired, for example, to receive correlation results indicating where there is coverage of a Preference of at least 60%, resulting from a query of whether the Comparison Data Set covers the Preferences by at least 60%. For this example, a condition with a reserved word, "!coverage" and with an assigned value of 0.6 as the first argument is used, resulting in the Comparison Data Set of:

"pub>Wed, 11 Jan 2006 20:11:44 GMT Live Music Podcast>!coverage=$percent>$percent=0.6"

Note that two conditions are added as arguments. The first condition, "!coverage=$percent", is a condition comprising a reserved word "!coverage" and serves a special processing directive. This first condition is placed within the Master List in accordance with the method to submit an Ontology End Point as described previously. The second condition, "$percent=0.6" assigns a value to the variable within the first condition so that the first condition may be evaluated when processed. The second condition of "$percent=0.6" condition not submitted as an Ontology End Point, but rather is added as an argument to the Comparison Data Set to enable a value for the variable "$percent" to be determined.

The values within the <description> element 323 are tokenized, which means they are transformed from their current representation to a set of keywords and phrases, and added to the Comparison Data Set, resulting in:

"pub>Wed, 11 Jan 2006 20:11:44 GMT Live Music Podcast>!coverage=$percent>$percent=0.6>Music> item>Recorded>live>at>Berk eley>Music item> Recorded live".

Note that the last two tokens derived from <description> ("Music item" and "Recorded live") appearing in the Comparison Data Set are phrases, in contrast with the preceding tokens (Music, item, Recorded, live, at, Berkeley) which are individual keywords.

The values within the <category> element 324 are transposed directly from the comma-delimited list to arguments which are added to the Comparison Data Set, resulting in:

"pub>Wed, 11 Jan 2006 20:11:44 GMT Live Music Podcast>!coverage=$percent>$percent=0.6>Music> item>Recorded>live>at>Berk eley>Music item> Recorded live>FM>MP3>Free>live> music>Berkeley campus".

Lastly, two more conditions, "$location=Berkeley" and "$location=Oakland", are added to the Comparison Data Set, one of which, "$location=Berkeley", does not reside within the Master List. The conditions are being added in this example to illustrate condition resolution during the correlation process. The resulting Comparison Data Set is:

"pub>Wed, 11 Jan. 2006 20:11:44 GMT Live Music Podcast>!coverage=$percent>$percent=0.6>Music> item>Recorded>live>at>Berk eley>Music item> Recorded live>FM>MP3>Free>live>music> Berkeley campus>$location=Berkeley>$location=Oakland".

With redundant arguments (live and music) removed, a final Comparison Data Set is as is depicted in FIG. 35:

"pub>Wed, 11 Jan 2006 20:11:44 GMT Live Music Podcast>!coverage=$percent>$percent=0.6>Music> item>Recorded>live>at>Berk eley>Music item> Recorded live>FM>MP3>Free>Berkeley campus> $location=Berkeley>$location=Oakland".

Figure 36:
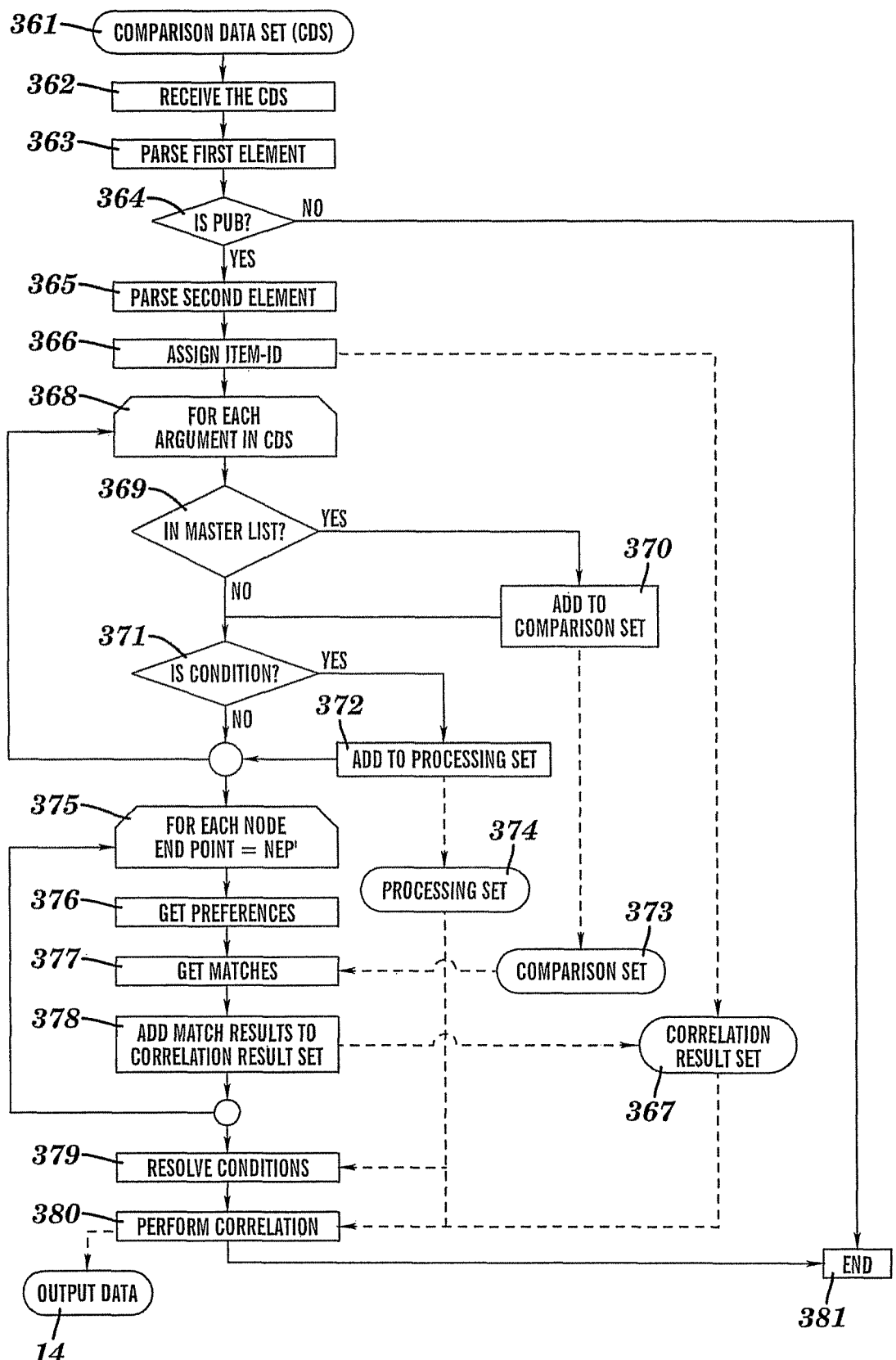
FIG. 36 is a flow chart depicting the processing of a Comparison Data Set, in accordance with embodiments of the present invention.

FIG. 36 is a flow chart depicting the processing of a Comparison Data Set 361, in accordance with embodiments of the present invention.

In step 362, the Comparison Data Set byte stream is received.

In step 363, the first element is parsed from the byte stream.

In step 364 it is determined whether or not the parsed first element is the constant value "pub". If step 364 determines that the parsed first element is the constant value "pub", then processing continues in step 365; otherwise, processing ends at step 381.

Step 365 the second element is parsed from the byte stream.

In step 366, the value of the second element is assigned as the "item-id" for the Publication Data item.

In step 366, the value for the item-id is stored within the Correlation Result Set 367, which is a temporary store for data that will be utilized for producing Output Data.

Steps 368-372 define a loop, each iteration of which is executed for each of the arguments within the Comparison Data Set, beginning with the first argument. In each iteration, the argument being processed is checked in step 369 to determine if the argument exists within the Master List (e.g., the Master List depicted in FIG. 27).

If the argument being processed in step 369 exists within the Master List, then step 370 adds the index value of the Ontology End Point from the Master List and the argument value to the Comparison Set 373, which is a temporary store for the values which are utilized to determine correlation with Preferences.

If the argument being processed in step 369 does not exist within the Master List, then step 371 is executed to determine whether the argument is a condition. If step 371 determines that the argument is a condition then step 372 adds the argument to the Processing Set 374, which is a temporary store for the values of conditions.

In this manner, all arguments are added to the appropriate, temporary store (i.e., Comparison Set 373 or Processing Set 374). Once the temporary stores have been populated, the method of the present invention is able to analyze Configuration Data to determine correlation beginning at step 375.

Figure 37:
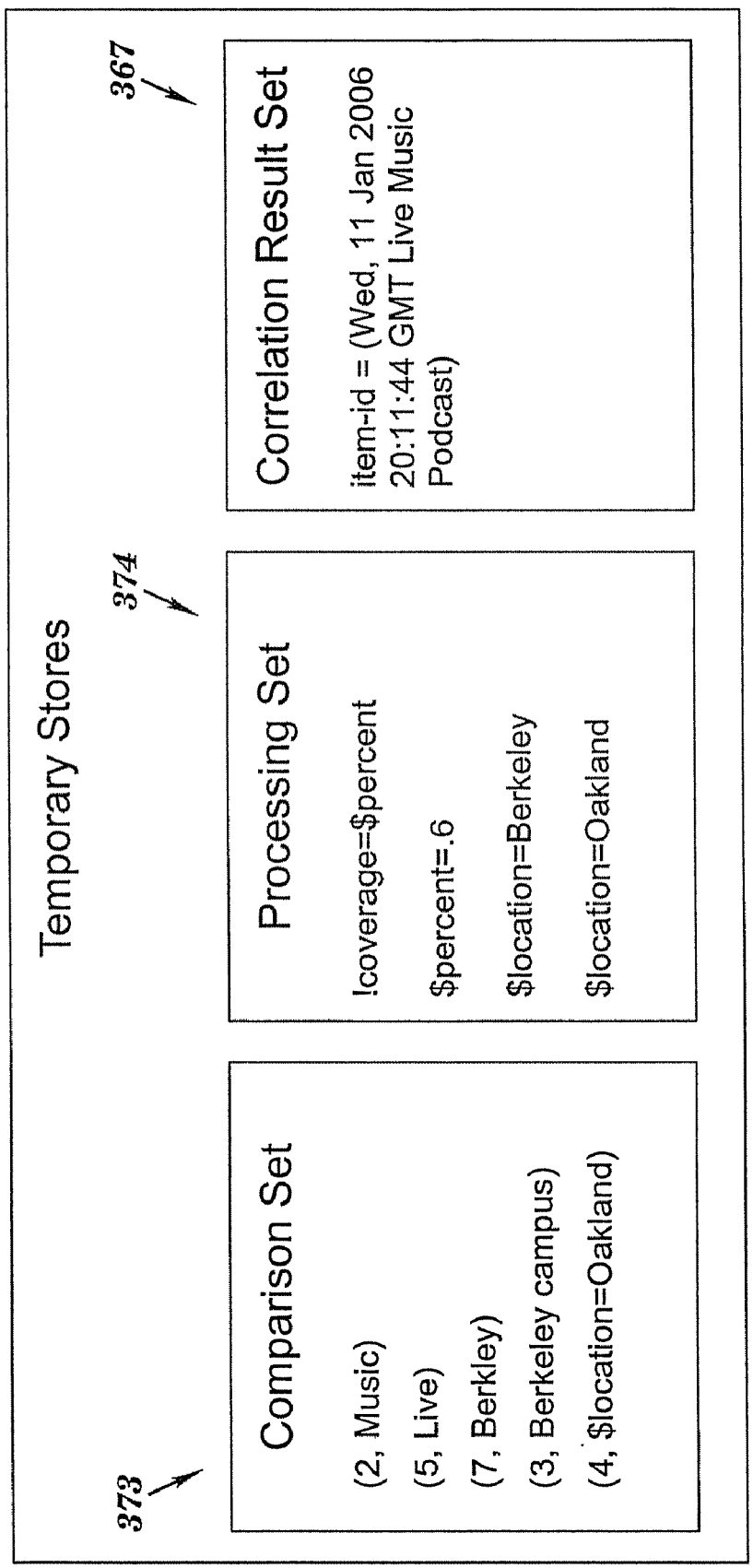
FIG. 37 depicts temporary stores which would be populated from applying the process of FIG. 36 to the example Comparison Data Set of FIG. 35, in accordance with embodiments of the present invention.

FIG. 37 depicts temporary stores which are populated from applying the process of FIG. 36 (at this point in the process after the loop of steps 368-372 has been performed) to the example Comparison Data Set of FIG. 35, in accordance with embodiments of the present invention. Thus, the Comparison Set 373 and Processing Set 374 are populated with the arguments from the Comparison Data Set of FIG. 35, and the Correlation Result Set 367 has been populated with an Item-id value from the Comparison Data Set of FIG. 35.

Returning to FIG. 36 to determine correlation, steps 375-378 define a loop, each iteration of which is executed for a Node End Point.

For each Node End Pont, step 376 retrieves the Preferences in the same manner as followed for Configuration Correlation Queries, as explained supra in conjunction with FIGS. 29-30.

In step 377, these Preferences are matched against the Comparison Set 373 with match results being added to the Correlation Result Set 367 in step 378.

After all Preference Hierarchies for all Node End Points have been matched against the Comparison Set 373, step 379 reads the Processing Set 374 to resolve conditions. Conditions which are resolved are those with variables which require a value in order to be solved. If the value for the variable is not provided by another condition within the Processing Set, it cannot be resolved and is said to be INDETERMINATE.

For example, the condition "!coverage=$percent" requires a value for $percent. That value is provided by the condition, "$percent=0.6". Therefore, the condition, "!coverage=$percent" resolves to "!coverage=0.6". Note that "!coverage=0.6" contains the reserved word, "!coverage" and indicates a special processing directive to be utilized when performing correlation in step 380. Specifically, in this example, the software is directed to only report coverage of Preferences by Production Data that equals or exceeds 60%.

The process of FIG. 36 may implement any special processing directives in the preceding manner.

The Publication Data processing method thus far applies to simple comparison and assignment activity in order to minimize processing instructions, making the invention practical for correlating large amounts of Configuration Data at high speed with a continuous stream of Publication Data.

FIG. 38 depicts the Correlation Result Set derived from the Temporary stores in FIG. 37 at two states, 382 and 383, during this step in the process, in accordance with embodiments of the present invention. State 382, which will be denoted henceforth as Correlation Result Set 382, exists after the Preference Hierarchies for the Node End Point "Jeff" have been processed and before the Preference Hierarchy for the Node End Point "Maria" has been processed. State 383, which will be denoted henceforth as Correlation Result Set 383, exists after the Preference Hierarchy for the Node End Point "Maria" has been processed.

Thus following execution of the process of FIG. 36 just prior to step 380, the Correlation Result Set has accrued match information for each Node End Point against which correlation analysis may be applied. In step 380, with conditions resolved and Correlation Result Sets complete, correlation is performed to generate the Output Data. 14 (see FIG. 2).

Note from FIG. 38 that the Correlation Result Set comprises the item-id and the following data for each Node End Point: NEP name and a match-list for each Preference Hierarchy of the NEP. For each Preference Hierarchy, the match-list comprises those Ontology End Points of the Preference Hierarchy which have a match in the Comparison Set 373).

In implementations where there are a large number of Node End Points to an extent that data associated with all of the Node End Points cannot be stored in available memory capacity (e.g., RAM), the Correlation Result Set may be limited to less than the total number of Node End Points, rather than having the Correlation Result Set contain all Node End Points. Thus the maximum number of Node End Points in the Correlation Result Set at any one time may be a function of the available memory capacity to store the content of the Correlation Result Set. Thus, step 380 of FIG. 36 may be performed at intervals such that in each interval there is available capacity to store the content of the Correlation Result Set relating to a subset of the total number of Node End Points.

Figure 39:
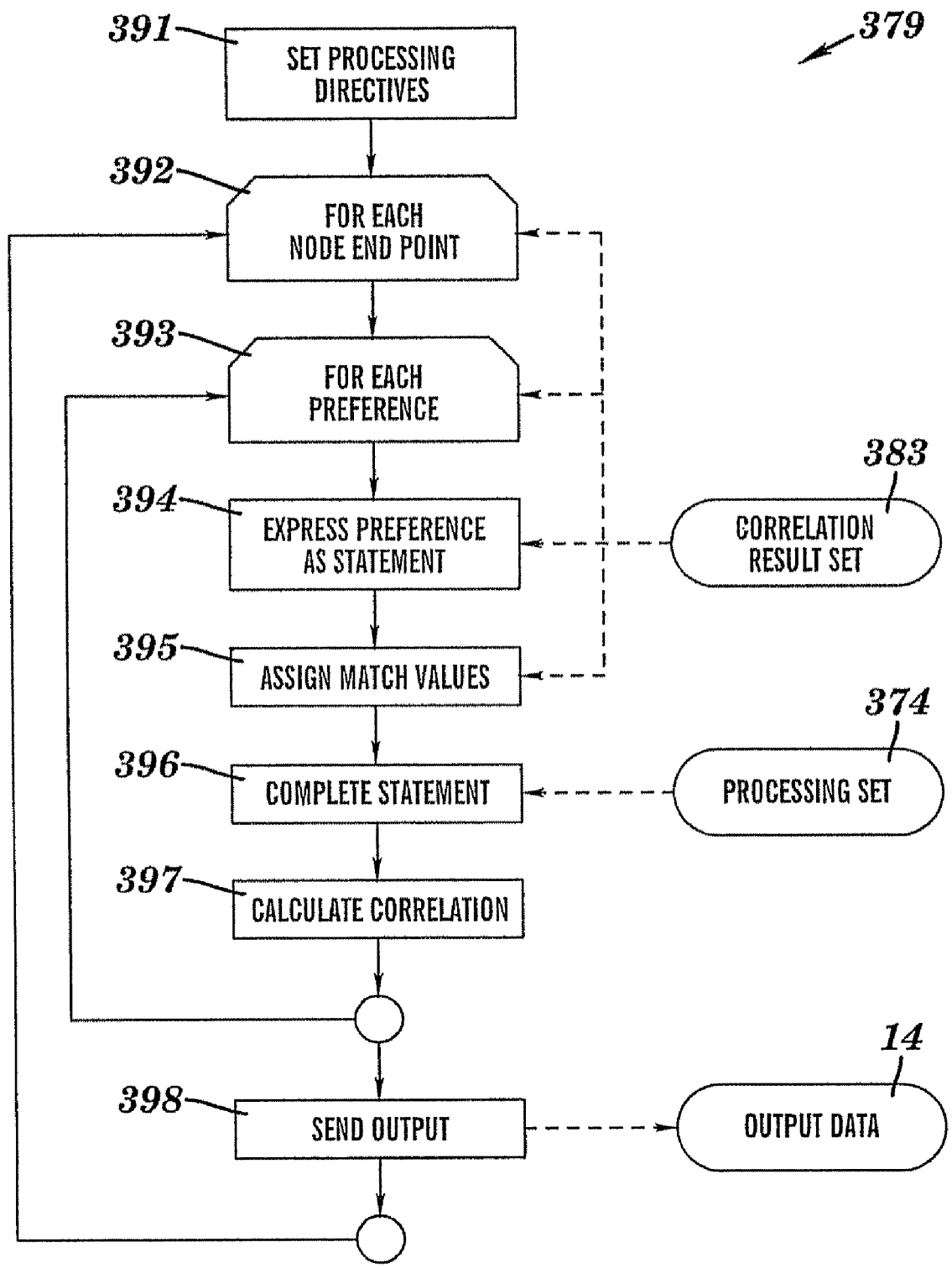
FIG. 39 is a flow chart that describes the Correlation process, in accordance with embodiments of the present invention.

FIG. 39 is a flow chart that describes the Correlation process, in accordance with embodiments of the present invention. Since the Correlation Result Set comprises data from which correlation may be performed, the Correlation process may be implemented as a separate, post-processing function, and may also be implemented as a multi-process, multi-threaded application to perform correlation activity for numerous Correlation Result Sets simultaneously with respect to given Configuration Correlation Query Data. Each Correlation Result Set may result from processing a unique combination of Configuration Data 21 and Publication Data 23 (see FIG. 2) in accordance with the process of FIG. 36.

The Correlation process of FIG. 39 will be described and illustrated utilizing a specific example with the Comparison Data Set of FIG. 35, Temporary Stores of FIG. 37, and state 383 of the Correlation Result Set 383 of FIG. 38.

In FIG. 39, step 391 sets the processing directives. For example, "!coverage=0.6" is passed to the process as a resolved Condition and indicates a directive to report coverage of Preferences by Production Data that equals or exceeds 60%, in response to a query of whether the Production Data (as represented by the Comparison Data Set) covers the Preferences by at least 60%.

Steps 392 and 398 define an outer loop over the Node End Points in the Correlation Result Set 383, and steps 393-397 define an inner loop over the Preference Hierarchies of each Node End Point in the Correlation Result Set 383.

In the first iteration of the outer loop, step 392 sets the Node End Point to the first Node End Point "Jeff" in the Correlation Result Set 383.

In the first iteration of the inner loop for processing the Node End Point "Jeff" in the outer loop, step 394 expresses the first Preference Hierarchy of the Node End Point "Jeff" within the Correlation Result Set 383 as a statement, such as: "2 AND 1 AND (3 OR 4)".

Step 395 assigns match values for each member of the statement, by comparing the elements of the statement with the match-list within the Correlation Result Set 383 for that Preference Hierarchy being processed in the inner loop. For example, since there are match values available for 2, 3, and 4 in the statement, the statement can be expressed as "TRUE AND FALSE AND (TRUE OR 4)", where a match equates to TRUE and the absence of a match equates to FALSE. Note that "4" in the statement is not resolved in step 395, because "4" denotes the condition "$location—Oakland" and conditions are resolved subsequently to complete the statement in step 396.

Step 396 completes the statement from the data provided by the Processing Set 374. In this example, there is one condition within the match-list; "$location=Oakland" expressed by index value 4. Since this condition consists of a variable mapped to a constant, it is fully resolved due to a direct match of the statement element 4. Accordingly, after execution of step 396, the statement is completed as "TRUE AND FALSE AND (TRUE OR TRUE)".

The condition may have also been resolved, and the statement completed, by consolidating multiple conditions within a Processing Set when sufficient aggregate information is provided within the Comparison Data Set to recreate the condition, as discussed infra in conjunction with FIG. 40.

Step 397 calculates a Correlation from the statement by deriving a "Comparison Value" as explained infra.

In step 398, the correlation results are sent as Output Data 14 (see FIG. 2) as discussed infra in conjunction with FIG. 41.

FIG. 40 depicts an Alternative Processing Set which contains sufficient aggregate information to resolve the condition of "$location=Oakland", in accordance with embodiments of the present invention.

The Alternative Processing Set in FIG. 40 identifies two arguments within the Comparison Data Set that have the respective values, "$location=$where-am-I" and "$where-am-I=Oakland". These two arguments may be consolidated to a single condition, "$location=Oakland". Then, querying the Master List, the condition could be discovered to exist with an index value of 4, resulting in viable match data. At this point, this derived match criteria could be utilized in the same manner as data from the match-list. Note that the Alternative Processing Set in FIG. 40 need not be a distinct dataset, but rather may serve as a description of a plurality of arguments within the Comparison Data Set which may be consolidated to resolve a condition. In this manner, indirectly referenced Preferences may be correlated with Publication Data.

An average match method for calculating a Comparison Value from a completed statement in step 397 of FIG. 39 comprises the following steps:
1. Decompose the statement into all, possible sub-statements.
2. Count the number of TRUE values within each sub-statement.
3. Divide the count by the total, possible TRUE values for the sub-statement.

This method for deriving and utilizing a Comparison Value is illustrated by the completed statement derived supra, namely "TRUE AND FALSE AND (TRUE OR TRUE)". This statement can be decomposed to two sub-statements: "TRUE AND FALSE AND TRUE" and "TRUE AND FALSE AND TRUE". Each of the preceding sub-statements have 2/3 matches, or TRUE values. Since a comparison value of 2/3 exceeds the special processing directive of 60% (also called a "correlation threshold criteria"), the correlation may be reported.

In this manner, the next Preference for "Jeff" is processed for correlation, resulting in "5 AND 6 AND 7 AND 9 AND (10 OR 11)", producing the sub-statements: "TRUE AND FALSE AND TRUE AND FALSE" and "TRUE AND FALSE AND TRUE AND FALSE". Each of the preceding sub-statements have only 2/4 matches. Thus, the processing directive of 60% is not met, and the correlation is not reported.

Similarly, the next Node End Point, "Maria", has the Preference Hierarchy processed for correlation, resulting in: "6 AND 5 AND 10 AND (7 OR 8)", producing the sub-statements: "FALSE AND TRUE AND FALSE AND TRUE" and "FALSE AND TRUE AND FALSE AND FALSE". The preceding sub-statements have only 2/4 matches and 1/4 matches, respectively. Thus, the processing directive of 60% is not met, and, the correlation is not reported.

In some embodiments, the correlation may be reported even if the processing directive is not met.

FIG. 41 depicts exemplary Output Data resulting from the correlation results illustrated in the preceding example, in accordance with embodiments of the present invention. The Output Data in FIG. 41 is a byte stream that includes the constant value "pub-result" to define the byte stream, the item-id of the Publication Data, the name of the Node End Point that met the correlation threshold criteria, the root node (Music) of the Preference within which the threshold was met, and the comparison value (0.67) for the Preference.

The contents of and format for the Output Data is dependent upon the implementation of the invention.

The implementation of the invention may utilize any correlation analytical model that is useful to the implementation. The average match method used in the preceding example is a practical technique for assessing Preference Hierarchy coverage.

Figure 42:
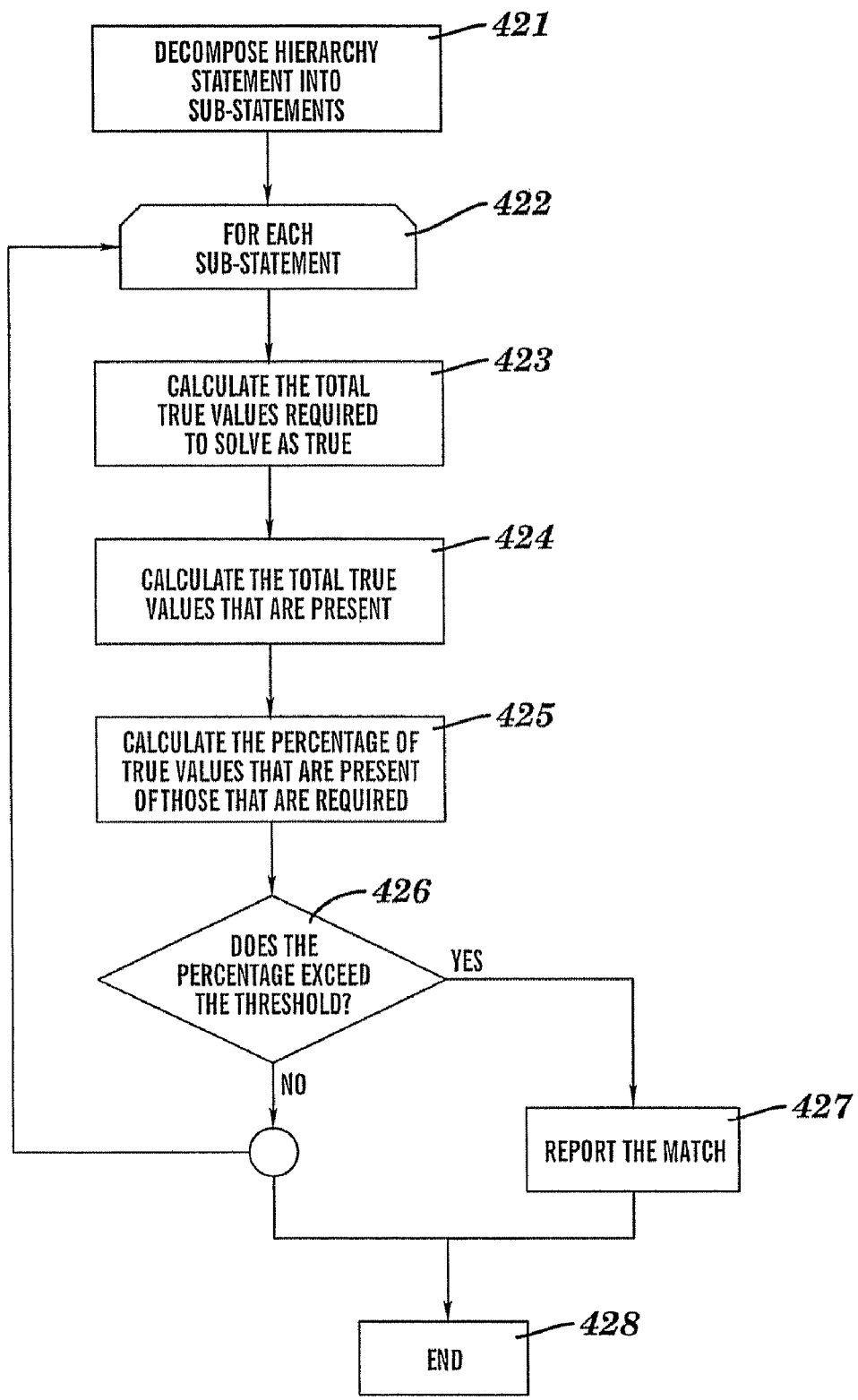
FIG. 42 is a flow chart depicting the average match method used for performing a correlation, in accordance with embodiments of the present invention.

FIG. 42 is a flow chart depicting the average match method used for performing a correlation, in accordance with embodiments of the present invention. The average match method calculates a useful comparison value with a minimum of processing.

In step 421 the statement which expresses the preference hierarchy is decomposed into its sub-statements.

Steps 422-426 define a loop over the sub-statements.

In Step 423 the total number of TRUE values required to solve the sub-statement as TRUE is calculated. This value is equal to the total number of instances of TRUE, FALSE, or INDETERMINATE, that are present between the AND operators in the sub-statement.

In Step 424 the total number of TRUE values is calculated by adding the number of instances of TRUE that are present within the sub-statement.

Step 425 calculates an average match ratio of the total number of TRUE values present as calculated in step 424 to the total number of TRUE values required as calculated in step 423.

In Step 426, the average match ratio calculated in step 425 is compared with the correlation threshold criteria. In step 426, if the calculated ratio exceeds the threshold, the match is reported in step 427. Once the match has been reported in step 427, the process ends at step 428, since any one sub-statement satisfying the correlation threshold criteria is required.

If all sub-statements have been processed, and the correlation threshold criteria has never been reached, the process ends at step 428 without any matches reported.

In some implementations of the invention, a single instance of Publication Data may not contain enough information to derive a comparison value from a preference hierarchy that exceeds a correlation threshold criteria. Rather, an aggregation of Publication Data over time is what may be required to derive a comparison value that is useful.

Therefore, it may be important to observe correlation over time and with multiple instances of Publication Data. For example, if the invention is applied to report the correlation of Preferences that represents a financial condition with a continuous stream of Publication Data that represents financial information, there is a period of time within which the invention performs the correlation to arrive at a useful result.

Figure 43:
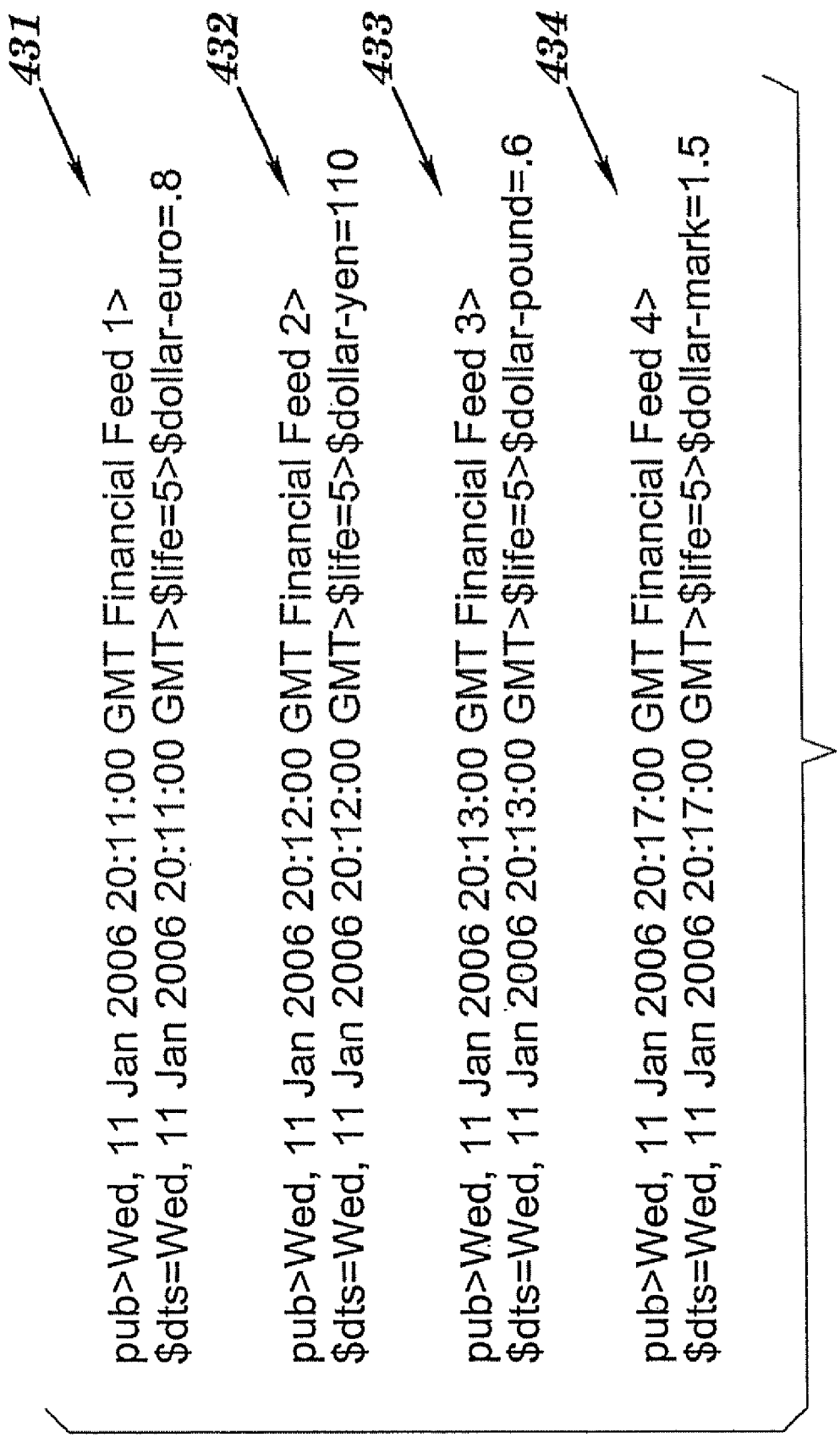
FIG. 43 depicts Comparison Data Sets containing time-limited conditions, in accordance with embodiments of the present invention.

FIG. 43 depicts four Comparison Data Sets, each of which contains time-limited conditions, in accordance with embodiments of the present invention. The conditions are: a date-time stamp, indicated by the condition $dts; a life span for the data, indicated by the condition $life=; and a final condition which is a ratio of international currencies.

CDS 431 has a date-time stamp of Wed, Jan 2006 20:11:00 GMT, has a life span of 5 minutes and contains a dollar to euro ratio expressed with the condition $dollar-euro=0.8.

CDS 432 has a date-time stamp of Wed, Jan 2006 20:12:00 GMT, has a life span of 5 minutes and contains a dollar to yen ratio expressed with the condition $dollar-yen=110.

CDS 433 has a date-time stamp of Wed, Jan 2006 20:13:00 GMT, has a life span of 5 minutes and contains a dollar to pound ratio expressed with the condition $dollar-pound=0.6.

CDS 434 has a date-time stamp of Wed, Jan 2006 20:17:00 GMT, has a life span of 5 minutes and contains a dollar to mark ratio expressed with the condition $dollar-mark=1.5.

Figures 44, 45:
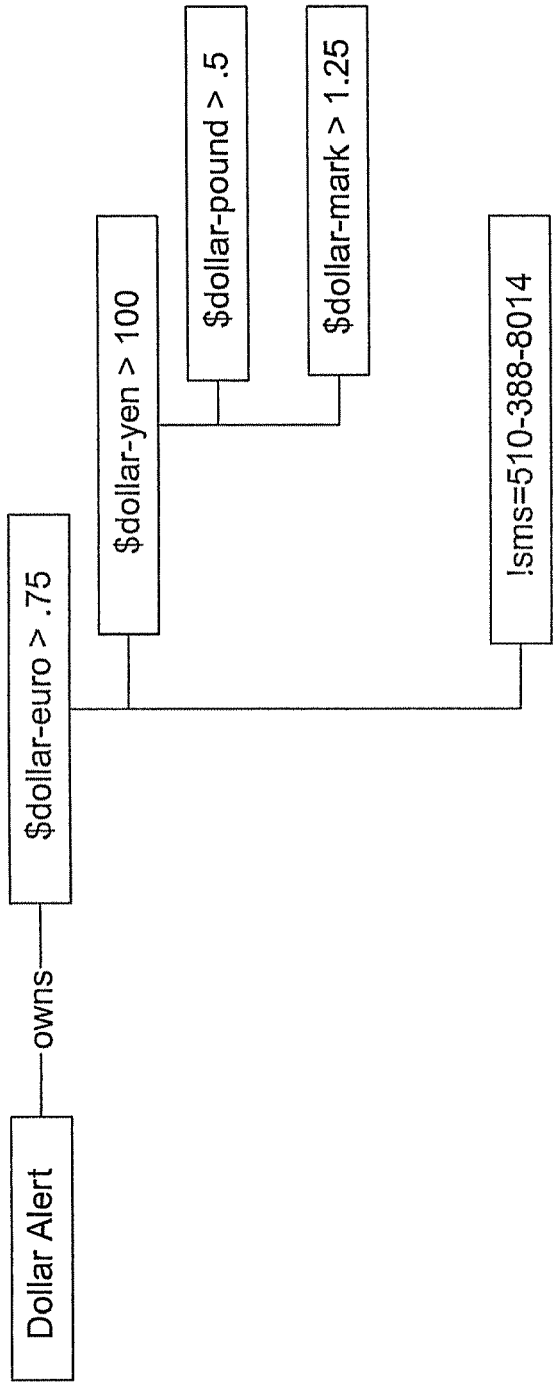
FIG. 44 depicts a preference hierarchy that may be used to perform correlation with the Comparison Data Sets of FIG. 43, in accordance with embodiments of the present invention.
FIG. 45 depicts the Output Data produced after correlation is performed for the preference hierarchy of FIG. 44 with respect to the Comparison Data Sets of FIG. 43, in accordance with embodiments of the present invention.

FIG. 44 depicts a preference hierarchy that may be used to perform correlation with the Comparison Data Sets of FIG. 43, in accordance with embodiments of the present invention. The preference hierarchy is owned by Node End Point, "Dollar Alert." The hierarchy contains five nodes, one of which is a special processing instruction, "!sms=510-388-8014" (i.e., send message via Short Message Service (SMS) using phone number 510-388-8014). The other four nodes each contain a condition which includes a financial ratio variable compared to a constant value by the operator ">".

The hierarchy in FIG. 44 may be expressed as the statement: "($dollar-euro>0.75) AND ($dollar-yen>100) AND (($dollar-pound>0.5) OR ($dollar-mark>1.25))"

Note that the special processing directive of "!sms=510-388-8014" is not included in the statement since, as a directive, it has no relevance to the correlation.

FIG. 45 depicts the Output Data produced after correlation is performed for the preference hierarchy of FIG. 44 with respect to the Comparison Data Sets of FIG. 43, in accordance with embodiments of the present invention. The Output Data includes: a date-time stamp of when the relevant time period began (Wed, January 2006 20:11:00 GMT); the date-time stamp of when the relevant time period ends (Wed, January 2006 20:16:00 GMT) which is 5 minutes after the date-time stamp; the name of the Node End Point (Dollar Alert); and the special processing directive (!sms=510-388-8014).

The Output Data of FIG. 45 was produced because the sub-statement "($dollar-euro>0.75) AND ($dollar-yen>100) AND ($dollar-pound>0.5)" evaluated to TRUE prior to the elapse of the 5 minute life span of CDS 431. Thus the Output Data of FIG. 45 is responsive to a query of whether the sub-statement "($dollar-euro>0.75) AND ($dollar-yen>100) AND ($dollar-pound>0.5)" evaluates to TRUE prior to the elapse of the 5 minute life span of CDS 431.

Note that the date-time stamp of CDS 434 is greater than the expiration of CDS 431 and equal to the expiration of CDS 432 and would, therefore, complete the sub-statement "($dollar-euro>0.75) AND ($dollar-yen>100) AND ($dollar-mark>0.5)" with a comparison value of 1/3, because the sub-statement evaluates to TRUE in the 5 minute time span irrespective of the value of $dollar-mark.

In one embodiment, the time-based processes may be accomplished through the use of a Persistent Processing Set.

Figures 46, 47:
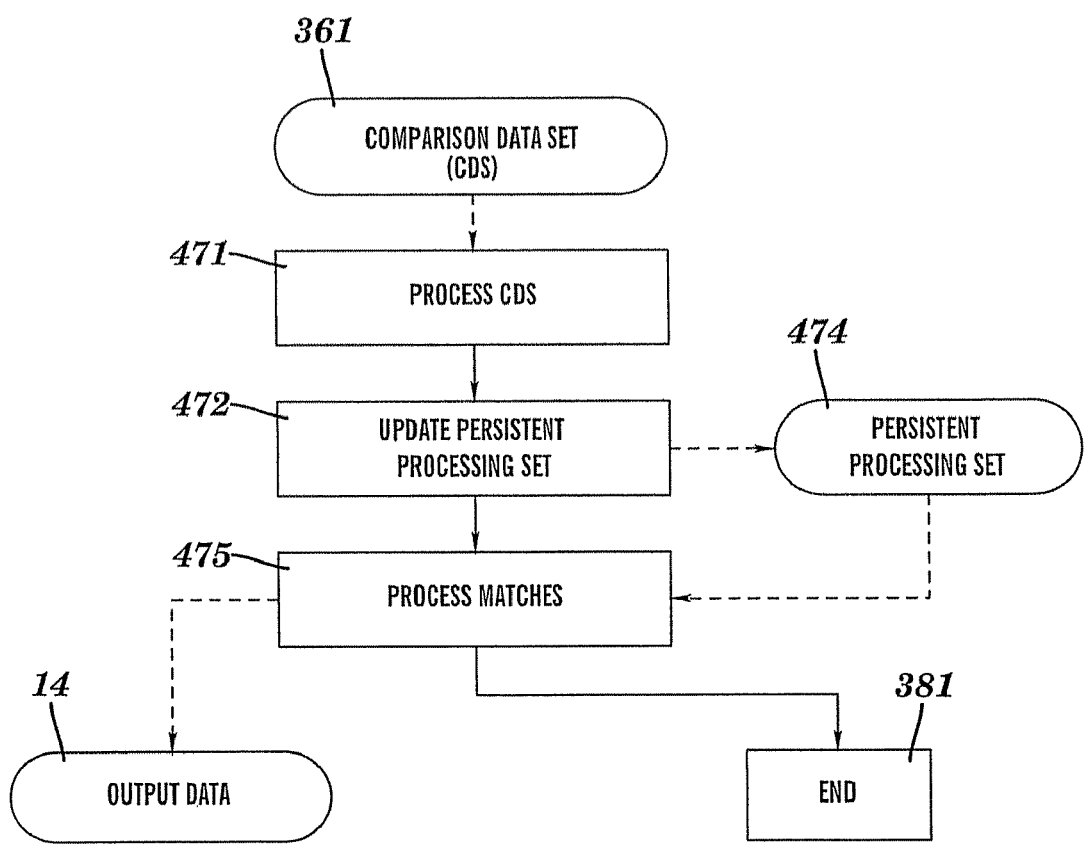
FIG. 46 depicts the state of the Persistent Processing Set at the time the match produced the Output Data of FIG. 45, in accordance with embodiments of the present invention.
FIG. 47 is a flow chart depicting aggregate processing of Publication Data utilizing a Persistent Processing Set, in accordance with embodiments of the present invention.

FIG. 46 depicts the state of the Persistent Processing Set at the time the match produced the Output Data of FIG. 45, in accordance with embodiments of the present invention. The difference between the Persistent Processing Set of FIG. 46 and the Processing Set 374 of FIG. 37, is the addition of time values for the condition being expressed. These time values comprise a date-time stamp for the condition and a life span for its persistence.

FIG. 47 is a flow chart depicting aggregate processing of Publication Data utilizing a Persistent Processing Set, in accordance with embodiments of the present invention.

The Persistent Processing Set 474 replaces the Processing Set 374 of FIG. 36.

Step 471 embodies steps 362-371 of FIG. 36.

Step 472 replaces step 372 of FIG. 36. Rather than adding conditions to the Processing Set 374 as is done in step 372, step 472 adds new conditions with their date-time stamp and life span to the Persistent Processing Set 474 and also removes conditions which have expired.

Step 475 embodies steps 375-380 of FIG. 36.

The process of FIG. 47 ends in step 381.

Special processing directives may be executed relative to their position within a preference.

Figure 48:
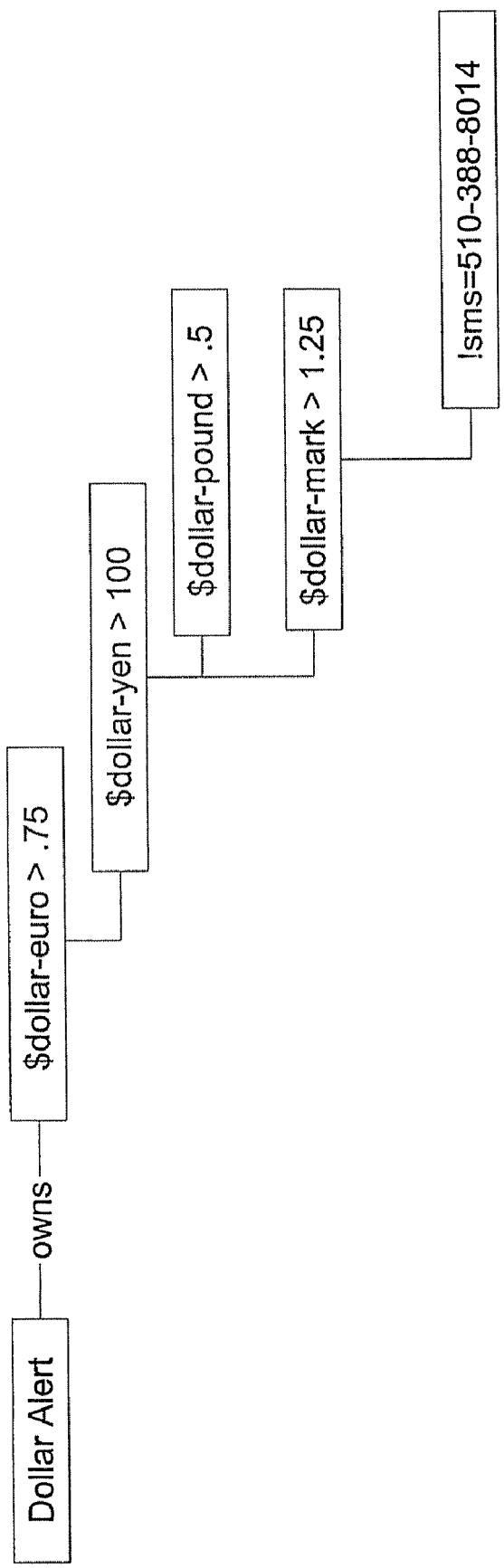
FIG. 48 depicts the preference hierarchy of FIG. 44 with the node containing the special processing directive attached to a child node rather than to the root node, in accordance with embodiments of the present invention.

FIG. 48 depicts the preference of FIG. 44 with the node containing the special processing directive (!sms=510-388-8014) attached to a child node ($dollar-mark>1.25) rather than to the root node ($dollar-euro>0.75), in accordance with embodiments of the present invention. In FIG. 44, since the special processing directive is attached to the root node, it would be executed upon a reported match with any sub-statement for the hierarchy. However, in FIG. 48, the special processing directive is attached to the sub-statement "($dollar-euro>0.75) AND ($dollar-yen>100) AND ($dollar-mark>0.5)". Therefore, only when that sub-statement would produce a match would the special processing directive be executed.

The present invention generates output in response to queries through correlation calculations, as explained and illustrated supra. The present invention can be utilized with respect to any applicable type of correlation, including correlation within the following types of query classes:

The preceding query classes are illustrated as follows.

1. Preference to Preference. Comparing the Configuration Data to understand relationships between Preferences and the Node End Points that own the Preferences. This query class compares preferences to other preferences in order to discover commonality or differences between them. For example, it may be useful to discover which preferences, or nodes within preferences, exist within a set of node end points. Shared preferences indicate a demonstrated interest in future events by more than one node end point. Therefore, understanding such interest would be useful in describing published data in such a manner that it will be directed toward that group of node end points when correlated against the preferences. For example, if 100,000 people express an interest in live acoustic guitar performances in Berkeley, then a publisher may ensure that the RSS contains that information in an event's description so that the message "finds" the group when it is published.

Also, it is possible to implement preference "sharing" where one node end point could adopt the preferences of another. For example, if a person (as a node end point) is interested in purchasing a car, the person may want to adopt the preference for automobiles of another person with similar interests, in order to receive car information as it is published.

2. Preference to Published Data: Comparing the Preferences with transient, external data. This query class compares the preferences to published data in order to correlate the published data with expressed preferences by node end points. For example, an individual is interested in certain topics and wishes to have information directed to him automatically if it correlates with his interest. The individual does not want to "search" to "find" the information, but would rather express the preference for the information, and have it delivered automatically once it is published and correlated with the preference to a specified degree.
3. Preference to Aggregate Published Data: Comparing the Preferences with transient, external data over a period of time. This query class compares preferences with published data over time in order to discover correlation when the information required for correlation exists in more than one item of published data. For example, an implementation may be to discover arbitrage opportunities in financial markets. By creating a preference that describes the condition by which the opportunity exists and correlating a continuous feed of financial data, such an opportunity may be found within a period of time that is sufficient to tale advantage of the opportunity.
4. Dynamic Preference to Published Data: Comparing Preferences that may continuously change with transient, external data. Responsive to the preferences being changed, the stored relationship numbers in RAM are changed to reflect the change in the preferences. This query class compares preferences that are changing to published data to produce correlation results that are relevant to dynamic conditions such as location, time, and type of connected computing platform. For example, a person may be connected to the Internet with a mobile device that reports its location. If a preference contains the location information (such as GPS data) and transmits it to the software so that the preference is continually updated, the person could receive correlated information that is relevant to their present location. This would be useful for pedestrian applications in which the pedestrian's favorite music is being performed a block away.

Also, it is possible that the active device type may indicate different special processing directives. For example, if a person is online with the person's phone, and a new song matches the person's preferences, the FM-quality version of the song is sent. If the person is online with the person's home computer, then the person may want the entire music video sent.
5. Dynamic Preference to Aggregate Published Data: Comparing Preference that may continuously change with transient, published data that persists over a period of time. This query class compares preferences that are changing to published data that is relevant over a period of time, producing correlation results that are timely and accurate in relation to dynamic conditions such as location, time, and type of connected computing platform. As an example pertaining to emergency applications, the main commute arteries are blocked between a driver's location and a hospital to which the driver is driving toward, wherein the consequent correlation would result in the driver taking the side streets and receiving updated maps for the new route.
6. Correlated activity: Executing Special Processing Directives relative to the position of a Node within a Preference. This query class enables the execution of specific logic depending upon where the special processing directive exists within the hierarchy. For example, an individual may want information that correlates very strongly with a preference to be sent via Short Message Service (SMS) to the individual's cell phone, and information that correlates moderately to be made available through an RSS reader. In this case, the special processing directive, to send the information via SMS, would reside as part of a long sub-statement within the hierarchy, while the directive to make the information available as RSS would reside as part of a smaller sub-statement within the hierarchy.
7. Correlation of abstract data: Comparing Preferences which contain conditions with transient, external data that also contain conditions, including conditions that evaluate to constants and other conditions. This query class enables preferences and published data to contain variables that may be resolved during the correlation process. This is useful in describing preferences as conditions which may be resolved according to the published data that is observed. It also allows external systems to implement additional data for correlation without the requirement to modify the correlation software.

For example, people may subscribe to closed communities of publishing and subscribing. These communities may be aligned by preferences that contain such things as particular interests, private access codes, and accessibility times and dates. The access codes, and accessibility rules may be expressed as conditions. (ie. $access_code=$private_key) Furthermore, the published data may contain values that complete those conditions in the form of constants or other conditions in one or more messages. (ie. $access_code=111, $private_key=$new_key, $new_key=111) Such access information becomes part of the correlation, and enables the private subscribers and publishers to share information, without the requirement of additional software.

Also, returning to the financial application, it may be useful to implement abstraction in any time-based implementation. This facilitates the aggregation of data and simplifies the creation of preferences. In the arbitrage example, the preference for the financial condition only needs to expressed once as a hierarchy of conditions. The published data may then send in the appropriate values to complete the conditions during correlation.

Figure 49:
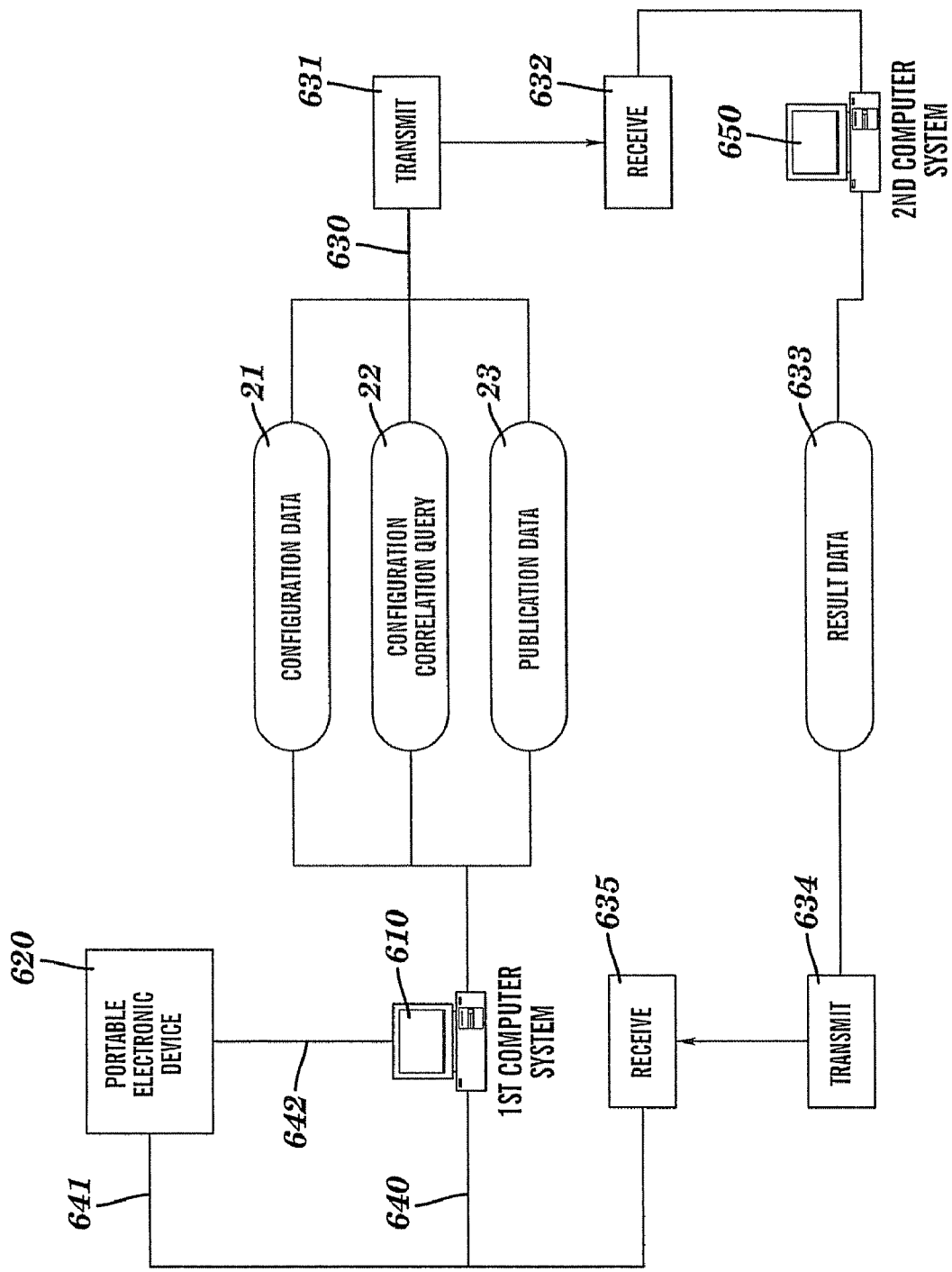
FIG. 49 depicts communication between two computers to implement correlation of information, in accordance with embodiments of the present invention.

FIG. 49 depicts communication between a first computer system 610 and a second computer system 650 to implement correlation of information, in accordance with embodiments of the present invention. The first computer system 610 transmits (631) input data (configuration data 21, publication data 23, and configuration query data 22) and over a data path 630. Said input data is received (632) by the second computer 650 which, in turn, generates result data 633 by performing configuration, correlation, and reporting activities as discussed supra. The second computer 650 generates and transmits (634) the result data 633 which is received (635) over data path 640 by the first computer 610. The data paths 630 and 640 may use distinct modes of data transfer or a common mode of data transfer (e.g., the Internet or an intranet).

As to the embedded usage in one embodiment of the present invention, a portable electronic device 620 (e.g., a hand-held device), may receive data over a wireless network connection (e.g., a wireless Internet connection), which is represented by the data path 641. The data received over the wireless network connection may comprise, inter alia, financial market data. The user of the portable electronic device may have expressed preferences for financial data in terms of configuration data 21 that is then resident on the portable electronic device 620 (and accessible to the first computer system 610). As financial data received over the wireless network connection by the portable electronic device 620 correlates with the configuration data 21, the reported result data 633 are displayed on the portable electronic device 620. In this embodiment, the result data 633 in FIG. 49 would be transmitted to the portable electronic device 620 over the data path 641 instead of, or in addition to, the first computer system 610. Alternatively, the first computer system 61 may receive the result data 633 over the data path 640 and then transmit the result data 633, and/or other report data computed as a function of the report data 633, to the portable electronic device 620 over another data path 642.

Figure 50:
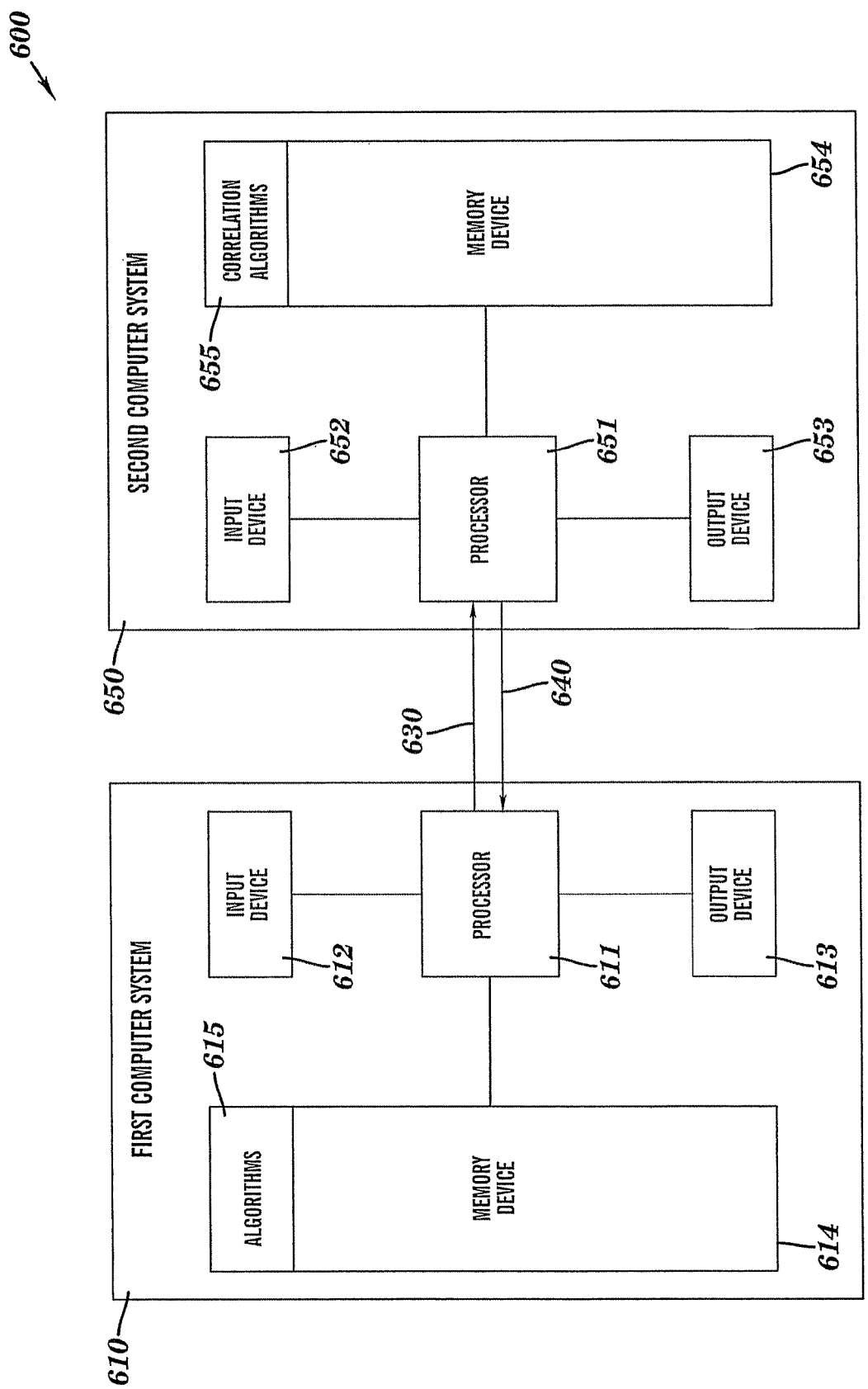
FIG. 50 is a block diagram of a computer network for implementing correlation of information, in accordance with embodiments of the present invention.

FIG. 50 is a block diagram of a computer network 600 for implementing correlation of information, in accordance with embodiments of the present invention. The computer network 600 comprises the first computer system 610 and the second computer system 650 of FIG. 49. The first computer system 610 and the second computer system 650 communicate over a data paths 630 and 640 such the Internet, an intranet, etc.

The first computer system 610 includes a processor 611 (representing at least one processor), an input device 612 (representing at least one input device) coupled to the processor 611, an output device 613 (representing at least one output device) coupled to the processor 611, and a memory device 614 (representing at least one memory device) coupled to the processor 611. The input device 612 may be, inter alia, a keyboard, a mouse, etc. The output device 613 may be, inter alia, a printer, a plotter, a computer screen, a magnetic tape, a removable hard disk, a floppy disk, a memory card, etc. The memory device 614 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 614 may store algorithms 615 and input data (i.e., configuration data 21, publication data 23, and/or configuration query data 22). The algorithms 615 may comprise computer software that implements transfer of input data (i.e., configuration data 21, publication data 23, and configuration query data 22) over the data path 630 as discussed supra in conjunction with FIG. 49. The memory device 614 may include the preceding input data (and any other input data such as user input data) for the algorithms. The memory device 614 may store the result data 633 received over the data path 640 from the second computer 650 to be manipulated by the algorithms with reporting results. The reporting results may be transmitted to the user at the computer system 610 and/or at the portable electronic device 620 as described supra in conjunction with FIG. 49. The output device 613 may display output from the algorithms 615. Additionally, the output device 613 may be used to display any other output, source code, graphics, etc.

The second computer system 650 includes a processor 651 (representing at least one processor), an input device 652 (representing at least one input device) coupled to the processor 651, an output device 653 (representing at least one output device) coupled to the processor, and a memory device 654 (representing at least one memory device) coupled to the processor 651. The input device 652 may be, inter alia, a keyboard, a mouse, etc. The output device 653 may be, inter alia, a printer, a plotter, a computer screen, a magnetic tape, a removable hard disk, a floppy disk, a memory card, etc. The memory device 654 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 654 may stores algorithms 655 and may also store input data for the algorithms 655. The memory device 654 also stores the input data (i.e., configuration data 21, publication data 23, configuration query data 22, and any other input data) received from the first computer system 610 over the data path 630. The algorithms 655 may comprise computer software that implements data translation to the byte stream format and transmission as discussed supra. The algorithms 655 include software that implement the processing of the configuration data 21, publication data 23, and configuration query data 22 to generate the result data 633 of FIG. 49. The output device 653 displays output from the algorithms 655. Additionally, the output device 653 may be used to display the input data, any other output, source code, graphics, etc.

The computer network 600 may function such that the first computer system 610 sends a byte stream to the second computer system 650 over the data path 630, wherein the second computer system 650 uses the algorithms 655 to create, modify, or delete correlation information, or to create publication information, or to apply correlation methods for the publication information, or to apply correlation methods to configuration information, or to report results by sending a byte stream to the first computer 610.

Figure 51:
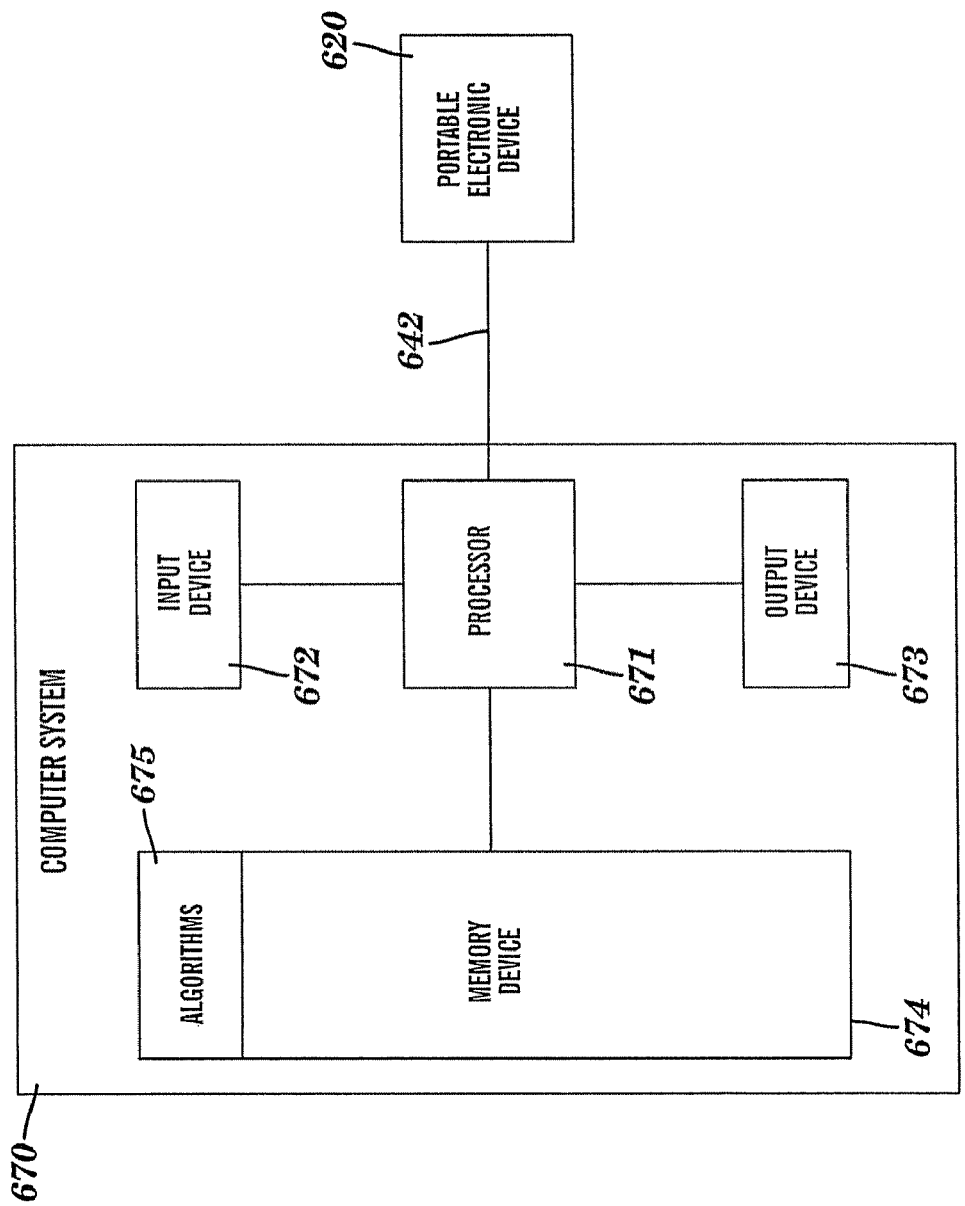
FIG. 51 is a block diagram of a computer system for implementing correlation of information, in accordance with embodiments of the present invention.

FIG. 51 is a block diagram of a computer system 670 for implementing correlation of information, in accordance with embodiments of the present invention. The computer system 670 includes the functionality of both the first computer system 610 and the second computer system 650 of FIG. 49. In addition, FIG. 51 depicts the portable electric device 620 of FIG. 49 coupled to the computer system 670 over the data path 642. All functionalities and capabilities of the present invention described supra in conjunction with FIGS. 49-50 are provided in FIG. 51 by the computer system 670 and the portable electric device 620, except that the computer system 670 includes the combined functionality of the first computer system 610 and the second computer system 650 of FIG. 49, so that the data paths 630 and 640 of FIGS. 49-50 is replaced by internal data paths within the computer system 670.

While FIGS. 49-51 depict the computer network 600 and computer system 610, 650, and 670 as particular configuration of hardware and software, any configuration of hardware and software, as would be known to a person of ordinary skill in the art, may be utilized for the purposes stated supra in conjunction with implementing embodiments of the present invention.

Any memory device of FIGS. 49-51 may be used as a computer usable medium (or a computer readable medium or a program storage device) having a computer readable program embodied therein and/or having other data stored therein, wherein the computer readable program comprises the computer code or software for implementing embodiments of the present invention. Generally, a computer program product (or, alternatively, an article of manufacture) of the computer system 610, 650, and/or 670 may comprise said computer usable medium (or said program storage device).

Any aspect of the present invention could be deployed, managed, serviced, etc. by a service provider who performs service(s) for a customer pertaining to correlating information in accordance with the present invention. Thus the present invention discloses a process for deploying or integrating computing infrastructure, comprising integrating computer-readable code into the computer system 610, 650, and 670 wherein the code in combination with the aforementioned computer systems is capable of performing a method for correlating information in accordance with the present invention.

In one embodiment, the invention provides a business method that performs the process steps of correlating information on a subscription, advertising, and/or fee basis. Thus, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for correlating input data comprising correlation data, wherein the correlation data describes at least one hierarchy comprising a first hierarchy, wherein each hierarchy of the at least one hierarchy comprises at least two nodes, wherein the nodes of each hierarchy of the at least one hierarchy each comprise a value and are each designated as an ontology end point consisting of a unique positive integer, said method being implemented by execution of computer readable program code on a processor of a computer system, said method comprising:

for each hierarchy of the at least one hierarchy, computing and storing in a first computer-readable storage medium of the computer system: a unique relationship number RN as a function of X and Y for each pair of parent-child nodes of said each hierarchy of the at least one hierarchy, wherein X and Y respectively denote the ontology end point of the parent node and the child node of said each pair of parent-child nodes; and computing at least one measure of correlation between the first hierarchy and other information comprising a second hierarchy of the at least one hierarchy or publication information extracted from a transient data feed, said computing the at least one measure of correlation being in response to a query that identifies the at least one measure of correlation to be computed, wherein said computing the at least one measure of correlation comprises retrieving and utilizing each stored relationship number of the first hierarchy; and outputting information relating to the computed at least one measure of correlation.

2. The method of claim 1, wherein the stored relationship numbers comprise sufficient information to enable reconstruction of each hierarchy of the at least one hierarchy.

3. The method of claim 1, wherein said outputting is responsive to determining that a specified criteria relating to the computed at least one measure of correlation has been satisfied.

4. The method of claim 1, wherein a data type of the value of a first node of the first hierarchy is a first condition comprising at least one conditional operator.

5. The method of claim 4, wherein the value of the first node of the first hierarchy comprises a variable, and wherein the first condition requires that the variable have a value satisfying a constraint with respect to a first conditional operator of the at least one conditional operator.

6. The method of claim 1, wherein the first computer-readable storage medium comprises random access memory (RAM), wherein said storing the relationship numbers comprises storing the relationship numbers in the RAM of the first computer-readable storage medium, wherein each hierarchy has an owner, wherein each owner has a value and each owner is designated as a node end point consisting of a positive integer, and wherein the method further comprises storing each unique node end point in the first computer-readable storage medium.

7. The method of claim 6, wherein said storing the node end points and said storing the relationship numbers result in the node end points and the relationship numbers being stored in a linked list in the RAM of the first computer-readable storage medium.

8. The method of claim 6, wherein the at least one hierarchy further comprises the second hierarchy, and wherein the node end point of the first and second hierarchies is a same node endpoint.

9. The method of claim 6, wherein the at least one hierarchy further comprises the second hierarchy, and wherein the node end point of the first and second hierarchies are different node end points.

10. The method of claim 6, wherein the method further comprises storing each unique node endpoint together with its associated value in a second computer-readable storage medium that is external to the first computer-readable storage medium.

11. The method of claim 10, wherein the ontology end points of each hierarchy are stored in a master list in the second computer-readable storage medium.

12. The method of claim 11, wherein said utilizing each stored relationship number of the first hierarchy comprises decoding each stored relationship number of the first hierarchy to ascertain the parent node and the child node of each pair of parent-child nodes of the first hierarchy, and wherein said computing the at least one measure of correlation comprises inferring the ontology end points of the first hierarchy from the ascertained parent node and child node of each pair of parent-child nodes of the first hierarchy.

13. The method of claim 12, wherein the at least one hierarchy further comprises the second hierarchy, wherein the other information comprises the second hierarchy, and wherein the method further comprises:

decoding each stored relationship number of the second hierarchy to ascertain the parent node and the child node of each pair of parent-child nodes of the second hierarchy;

inferring the ontology end points of the second hierarchy from the ascertained parent node and child node of each pair of parent-child nodes of the second hierarchy, wherein the at least one measure of correlation comprises at least one of $F_{12}$ and $F_{21}$, wherein $F_{12}$ is a fraction of node end points of the first hierarchy included within the node end points of the second hierarchy, and wherein $F_{21}$ is a fraction of node end points of the second hierarchy included within the node end points of the first hierarchy.

14. The method of claim 11, wherein said method further comprises:

generating at least one comparison data set comprising the other information, wherein the other information comprises the extracted publication information; and generating a correlation result set comprising the node end point of the first hierarchy and those ontology end points of the first hierarchy that have a match with the extracted publication information in the at least one comparison data set.

15. The method of claim 14, wherein the data feed comprises Really Simple Syndication (RSS).

16. The method of claim 14, wherein said generating the at least one comparison data set comprises adding a first condition to the at least one comparison data set, and wherein the method further comprises adding the first condition as an ontology end point to the master list.

17. The method of claim 16, wherein the first condition is determined by a plurality of arguments in the comparison data set.

18. The method of claim 16, wherein the first condition is associated with a special processing directive, and wherein said computing the at least one measure of correlation comprises executing the special processing directive to determine whether the computed at least one measure of correlation satisfies the first condition.

19. The method of claim 16,
wherein the first condition comprises a variable;
wherein said generating the correlation result set comprises adding a second condition to the at least one comparison data set such that second condition assigns a value to the variable; and
wherein the method further comprises: after adding the first and second condition to the at least one comparison data set and before computing the at least one measure of correlation, resolving the first condition by utilizing the second condition to assign the value to the variable.

20. The method of claim 14, wherein the data type of the value of a first node of the first hierarchy is an unresolved first condition, wherein the extracted publication information comprises first data that may be used to resolve the first condition, and wherein the method further comprises resolving the first condition through use of the first data.

21. The method of claim 14, wherein said computing the at least one measure of correlation comprises expressing the first hierarchy as a logical statement, and wherein said expressing comprises assigning TRUE, FALSE, or INDETERMINATE to each ontology end point in the statement respectively having a match, not having a match, or being indeterminate in the at least one comparison data set.

22. The method of claim 21, wherein said computing the at least one measure of correlation comprises computing an average match ratio, and wherein the average match ratio is the number of instances of TRUE in the statement divided by the total number of instances of TRUE, FALSE, and INDETERMINATE in the statement.

23. The method of claim 14, wherein the at least one comparison data set consists of a plurality of time-sequenced comparison data sets, wherein each comparison data set of the plurality of comparison data sets comprises a time stamp and a life span, and wherein said computing the at least one measure of correlation comprises determining that the value of the statement is TRUE at a time comprised by the life span of at least two comparison data sets of the plurality of comparison data sets.

24. A computer program product, comprising a computer readable storage device having a computer readable program code stored therein, said computer readable program code configured to be executed on a processor of a computer system to implement a method for correlating input data comprising correlation data, wherein the correlation data describes at least one hierarchy comprising a first hierarchy, wherein each hierarchy of the at least one hierarchy comprises at least two nodes, wherein the nodes of each hierarchy of the at least one hierarchy each comprise a value and are each designated as an ontology end point consisting of a unique positive integer, said method being implemented by execution of computer readable program code on a processor of a computer system, said method comprising:

for each hierarchy of the at least one hierarchy, computing and storing in a first computer-readable storage medium of the computer system: a unique relationship number RN as a function of X and Y for each pair of parent-child nodes of said each hierarchy of the at least one hierarchy, wherein X and Y respectively denote the ontology end point of the parent node and the child node of said each pair of parent-child nodes; and computing at least one measure of correlation between the first hierarchy and other information comprising a second hierarchy of the at least one hierarchy or publication information extracted from a transient data feed, said computing the at least one measure of correlation being in response to a query that identifies the at least one measure of correlation to be computed, wherein said computing the at least one measure of correlation comprises retrieving and utilizing each stored relationship number of the first hierarchy; and outputting information relating to the computed at least one measure of correlation.

25. A computer system comprising a processor and a computer readable storage unit coupled to the processor, said storage unit containing computer readable program code configured to be executed by the processor to implement a method for correlating input data comprising correlation data, wherein the correlation data describes at least one hierarchy comprising a first hierarchy, wherein each hierarchy of the at least one hierarchy comprises at least two nodes, wherein the nodes of each hierarchy of the at least one hierarchy each comprise a value and are each designated as an ontology end point consisting of a unique positive integer, said method being implemented by execution of computer readable program code on a processor of a computer system, said method comprising:

for each hierarchy of the at least one hierarchy, computing and storing in a first computer-readable storage medium of the computer system: a unique relationship number RN as a function of X and Y for each pair of parent-child nodes of said each hierarchy of the at least one hierarchy, wherein X and Y respectively denote the ontology end point of the parent node and the child node of said each pair of parent-child nodes; and computing at least one measure of correlation between the first hierarchy and other information comprising a second hierarchy of the at least one hierarchy or publication information extracted from a transient data feed, said computing the at least one measure of correlation being in response to a query that identifies the at least one measure of correlation to be computed, wherein said computing the at least one measure of correlation comprises retrieving and utilizing each stored relationship number of the first hierarchy; and outputting information relating to the computed at least one measure of correlation.

* * * * *